US008276393B2

(12) United States Patent
Critoph

(10) Patent No.: US 8,276,393 B2
(45) Date of Patent: Oct. 2, 2012

(54) HEAT EXCHANGER

(75) Inventor: Robert Critoph, Balsall Common (GB)

(73) Assignee: University of Warwick, Coventry (GB)

( * ) Notice: Subject to any disclaimer, the term of this patent is extended or adjusted under 35 U.S.C. 154(b) by 701 days.

(21) Appl. No.: 12/440,439

(22) PCT Filed: Sep. 7, 2007

(86) PCT No.: PCT/GB2007/050528
§ 371 (c)(1),
(2), (4) Date: Sep. 1, 2009

(87) PCT Pub. No.: WO2008/029185
PCT Pub. Date: Mar. 13, 2008

(65) Prior Publication Data
US 2010/0024448 A1    Feb. 4, 2010

(30) Foreign Application Priority Data

Sep. 8, 2006   (GB) ................................ 0617721.6

(51) Int. Cl.
*F25B 15/00* (2006.01)
(52) U.S. Cl. .......................................... 62/101; 62/476
(58) Field of Classification Search .................. 62/101, 62/476, 485, 486, 478; 165/166, DIG. 185
See application file for complete search history.

(56) References Cited

U.S. PATENT DOCUMENTS

| | | |
|---|---|---|
| 2,224,219 A | 12/1940 | Dasher |
| 3,396,782 A | 8/1968 | Valyi |
| 4,246,961 A | 1/1981 | Chaix et al. |
| 4,367,079 A * | 1/1983 | Wallsten ........................ 96/126 |
| 4,377,398 A * | 3/1983 | Bennett ........................... 96/146 |
| 4,581,049 A | 4/1986 | Januschkowetz |

(Continued)

FOREIGN PATENT DOCUMENTS

DE     33 47 700 A1    7/1985

(Continued)

OTHER PUBLICATIONS

Office Action dated Mar. 9, 2012 for corresponding Japanese Application No. 2009-527213 (3 pgs.).

(Continued)

*Primary Examiner* — Mohammad Ali
(74) *Attorney, Agent, or Firm* — Shumaker & Sieffert, P.A.

(57) ABSTRACT

This invention relates to the field of heat-driven cooling devices, heat pumps or thermal transformers, in particular to those devices, known as sorption devices, which employ an ad- or absorbent material as a chemical compressor to raise the pressure of a refrigerant gas. This invention is particularly concerned with a heat exchanger suitable for use as a generator in a sorption device. Embodiments of the invention provide a heat exchanger comprising: a plurality of stacked plate members each plate member being provided with at least one fluid channel therein, each plate member having a channel inlet and a channel outlet associated with each channel of the plate member; a plurality of chambers, the chambers being provided between opposed major faces of respective adjacent plate members, the chambers containing a sorbent material; a thermal fluid inlet in communication with a plurality of the channel inlets and a thermal fluid outlet in communication with a plurality of the channel outlets; and a sorbate inlet and a sorbate outlet in communication with each of the chambers, the fluid channels being provided in fluid isolation from the chambers.

26 Claims, 23 Drawing Sheets

U.S. PATENT DOCUMENTS

| | | | |
|---|---|---|---|
| 5,649,428 A * | 7/1997 | Calton et al. | 62/94 |
| 5,733,451 A * | 3/1998 | Coellner et al. | 210/496 |
| 5,875,648 A | 3/1999 | Boye et al. | |
| 6,074,972 A | 6/2000 | Bratton et al. | |
| 6,213,197 B1 | 4/2001 | Ebbeson | |
| 6,508,862 B1 * | 1/2003 | Tonkovich et al. | 95/106 |
| 6,530,424 B2 * | 3/2003 | Jamison et al. | 165/153 |
| 6,828,675 B2 * | 12/2004 | Memory et al. | 257/714 |
| 6,869,462 B2 * | 3/2005 | TeGrotenhuis et al. | 95/51 |
| 6,918,434 B2 * | 7/2005 | Strahle | 165/167 |
| 6,973,963 B2 * | 12/2005 | Dunne et al. | 165/104.12 |
| 7,032,654 B2 * | 4/2006 | Wand et al. | 165/133 |
| 7,041,260 B1 * | 5/2006 | Hong et al. | 422/198 |
| 7,044,437 B1 * | 5/2006 | Martin | 251/127 |
| 7,051,789 B2 * | 5/2006 | Sheppard | 165/67 |
| 7,051,799 B2 * | 5/2006 | Wu et al. | 165/167 |
| 7,159,650 B2 * | 1/2007 | Brost et al. | 165/167 |
| 7,306,030 B2 * | 12/2007 | Luvisotto et al. | 165/284 |
| 2004/0231828 A1 | 11/2004 | Dunne et al. | |

FOREIGN PATENT DOCUMENTS

| | | |
|---|---|---|
| DE | 197 28 116 A1 | 1/1999 |
| FR | 2 666 875 A | 3/1992 |
| FR | 2 693 542 | 1/1994 |
| GB | 17672 | 12/1916 |
| JP | 02 152513 A | 12/1988 |
| JP | 05 157400 A | 6/1993 |
| JP | 06 082116 A | 3/1994 |
| JP | 10 141803 A | 5/1998 |
| JP | 2000510566 | 8/2000 |
| JP | 2002543366 | 12/2002 |
| JP | 2006125765 | 5/2006 |
| WO | 00/34728 A1 | 6/2000 |
| WO | 0066954 | 11/2000 |
| WO | 2004/011859 A1 | 2/2004 |
| WO | 2004/097323 A1 | 11/2004 |
| WO | 2007/017274 A2 | 2/2007 |

OTHER PUBLICATIONS

Office Action from corresponding CN Application No. 200780033073.9, mailed Jan. 13, 2011, 3 pages.

International Search Report and Written Opinion of corresponding PCT Application No. PCT/GB2007/050528 dated Mar. 7, 2008 (15 pages).

United Kingdom Search Report dated Nov. 22, 2007 for Great Britain Application No. GB 07 17 420.4, 2 pgs.

United Kingdom Search Report dated Mar. 18, 2008 for Great Britain Application No. GB 07 17 420.4, 2 pgs.

* cited by examiner

HEAT EXCHANGER

This invention relates to the field of heat-driven cooling devices, heat pumps or thermal transformers, in particular to those devices, known as sorption devices, which employ an ad- or absorbent material as a chemical compressor to raise the pressure of a refrigerant gas. This invention is particularly concerned with a heat exchanger suitable for use as a solid-gas reactor, which will be referred to hereinafter as a sorption device.

Heat pumps, thermal transformers and cooling systems are generally based on the thermodynamics of condensation and evaporation of a refrigerant gas. On condensation of a gas to a liquid, heat is rejected to the environment and on evaporation of a liquid, heat is absorbed. The evaporation/condensation cycle is driven by compression. If a selected environment is brought into thermal contact with the gas/liquid only during the evaporation phase, for example, then that environment experiences an overall cooling effect.

In conventional air conditioning units the necessary compression is driven by mechanical work that is normally provided by an electrical motor. By way of contrast, solid sorption devices (whether operated as heat pumps or cooling systems) are driven by the adsorption or absorption of the refrigerant gas (or sorbate), such as ammonia, by a solid or liquid sorbent. The sorbent therefore acts as a chemical compressor.

In comparison with conventional air conditioners, those based on a sorption cycle have the benefit that the energy needed to drive the system can be in the form of heat. A sorption heat pump or cooling system may be gas or oil fired or even solar powered. The use of primary heat energy as a driver, as opposed to a secondary source such as electricity, means that sorption devices inherently offer the potential to be more energy efficient.

Particularly wasteful in terms of input energy are air conditioning systems used in vehicles. Conventionally, these are fuel-powered mechanical devices directly driven by the vehicle's engine. It has been estimated that around 8% of car fuel consumption is attributable to the air conditioning system. As the price of fuel rises and awareness of the environmental consequences of road travel increases, there is a growing demand for a more efficient and environmentally friendly mobile air conditioning system.

Sorption-based air conditioning systems are theoretically well placed to meet this demand. Such systems may be powered by waste heat from the engine water cooling jacket and/or the engine exhaust gas, and therefore reduce fuel consumption by up to 10%. The running costs of a vehicle and undesirable gas emissions (such as $CO$, $CO_2$, $NO_x$, $SO_x$, etc.) may be reduced by using such a power source.

In its simplest form a sorption device consists of a linked generator and receiver enclosing a sorbate gas. The receiver acts either as an evaporator or a condenser at different times. A sorbent material, such as an active carbon, a zeolite or silica gel, is present in the generator.

Operation of the devices is performed by cycling the temperature of a thermal fluid that is pumped through the generator. The thermal fluid may be heated using one or more of the heat sources described above, and cooled to ambient temperature.

When the generator is at essentially ambient temperature, a relatively large amount of sorbate material is adsorbed in the sorbent material. On heating the generator, the sorbate desorbs from the sorbent, raising the internal pressure of the generator, which forms a closed system with the receiver. Under pressure, the sorbate condenses in the receiver and rejects heat to the environment.

The generator is then cooled back to ambient temperature, leading to readsorbtion of the sorbate, reducing the system pressure. The reduced pressure in the receiver causes the liquid therein to boil. In this phase of the cycle heat is thereby extracted from the environment to the receiver, producing an external cooling/refrigeration effect.

If cooling is desired, it is apparent that the cycle described above is discontinuous since useful cooling occurs for only half the cycle. Two such systems operating out of phase however could theoretically provide continuous cooling.

A further improvement in efficiency can be made by arranging for regeneration of heat. That is, the heat rejected as the generator of one system is cooled is used to pre-heat the generator of the other.

There are a number of sorption devices described in the prior art. See, for example, WO 2004/011859, which discloses an energy efficient regenerative thermal compressive device. The device comprises an array of generator modules arranged in two banks to either side of a heating zone. A thermal fluid (heat carrying fluid) is driven past the modules in a reversible direction. During one phase, generators in the first bank are cooled and therefore in various stages of sorbate re-adsorption. Sorbate in associated evaporator region(s) therefore boils, enabling cooling of surrounding fluid. Generators in the other bank will be in various stages of desorption. Sorbate in associated condenser region(s) condenses, enabling heating of the environment.

During the subsequent phase of the cycle, the generators switch function.

Practically, the device described in WO 2004/011859 and other sorption devices may be based on any of a number of sorbate/sorbent pairs. The sorbent material may, for example, be active carbon, zeolite, silica gel, metal halide, metal alloy, water or a combination thereof. Examples of sorbate materials include ammonia, water, alcohols, hydrogen, hydrocarbon, hydrofluorocarbon and carbon dioxide.

Sorption devices do however suffer from the disadvantages of low cooling or heating power density and high capital cost. The cooling or heating power density of a sorption device is an indicator of the degree of cooling or heating that can be achieved per unit volume of sorbent. Accordingly, to generate a given cooling or heating power, the size and consequently cost of the sorption generator (which houses the sorbent) may need to be increased. These factors have hitherto prevented development of a commercially viable sorption-based mobile air conditioning unit.

In order to provide a comfortable degree of cooling, a sorption-based cooling unit based on any currently available design would be prohibitively large. By way of contrast, current mechanical-based vehicle air conditioning systems occupy only a small part of the engine compartment. For example, prior art commercially available sorption cooling systems provide up to 10 W of cooling per litre of volume, whilst conventional vapour compression cycles in vehicles provide greater than 1 kW of cooling per litre of compressor.

In order to put sorption technology on a competitive level with conventional mobile air conditioning systems, there is a need to provide an alternative design of sorption generator with improved cooling power density, and therefore potentially reduced size and cost.

A heat exchanger formed from a stack of plates bonded together is also known in the prior art. WO 00/34728 describes a heat exchanger for use as a packed bed catalytic reactor with inlet and outlet openings for first and second fluids. Each plate within the stack is perforated with alternating series of slots, such that the series of slots define two separate passageways through the stack. A first fluid is therefore passed through the first passageway, where it may contact a catalyst. The second fluid, passing through the second passageway, exchanges heat with the first fluid and acts as a coolant or heat source as required. The advantage of the stacked plate type of reactor is that it is a more efficient liquid-liquid heat exchanger than the alternative shell and tube designs. It therefore permits a more compact reactor design.

It is an object of embodiments of the present invention to provide an alternative design of heat exchanger for use as a generator with improved cooling power density in sorbent-sorbate thermal compressive devices. Such a generator would be suitable for incorporation in mobile or other air conditioning units, heat pumps, thermal transformers or refrigerators. It is particularly an object of embodiments of the present invention to provide an alternative design that is suitable for use with a vehicle air conditioning system. The reductions in manufacturing costs and improvements in performance also make the invention useful in applications such as gas fired heat pumps, thermal transformers and air conditioners including solar heat powered air conditioners.

A low cost design and compact construction are desirable features of the generator, particularly for automotive applications.

In a first aspect of the invention there is provided a heat exchanger comprising:
 a plurality of stacked plate members each plate member being provided with at least one fluid channel therein, each plate member having a channel inlet and a channel outlet associated with each channel of the plate member;
 a plurality of chambers, the chambers being provided between opposed major faces of respective adjacent plates members, the chambers containing a sorbent material;
 a thermal fluid inlet in communication with a plurality of the channel inlets and a thermal fluid outlet in communication with a plurality of the channel outlets; and a sorbate inlet and a sorbate outlet in communication with each of the chambers, the fluid channels being in fluid isolation from the chambers.

Embodiments of the invention have the advantage that they may be used in thermal fluid/solid sorbent heat exchanger systems. Furthermore, embodiments of the invention provide a heat exchanger with low thermal mass capable of providing an efficient exchange of heat between a solid and a liquid. A more compact and efficient design of heat exchanger is thereby made possible. Heat exchangers according to some embodiments of the invention may be made of sufficiently compact size and low weight that they are suitable for use in mobile air conditioning systems.

Preferably, each plate member comprises a first plate element and a second plate element in mutual abutment thereby to define the at least one channel.

Preferably, at least one selected from amongst the first and second plate elements are provided with a series of open channels thereon.

In some embodiments of the invention only one of the first and second plate elements is provided with a series of open channels thereon. In some embodiments the open channels are substantially straight and parallel to one another. In some embodiments the open channels are substantially perpendicular to a pair of opposed edges of the plate elements.

In some embodiments open channels are provided on both the first and the second plate element. The open channels may be formed at an angle to a pair of opposed edges of the plate elements.

The channels formed on the respective first and second plate elements of a plate member may be at an angle with respect to one another, the arrangement being such that fluid passing through the plate member is forced through portions of the channels formed in each of the first and second plate elements.

This feature has the advantage of enhancing a rate of thermal transfer between fluid passing through the channels and walls defining the channels.

The channels in one or both of the respective first and second plate elements may be in the form of chevrons or any other suitable pattern to promote thermal transfer. The chevron patterns in respective first and second plate elements may be rotated with respect to one another by an angle of substantially 180°.

In some embodiments one or more channels are arranged at an angle of substantially 45° with respect to opposed edges of a plate element, such that the channels in opposed plates are substantially perpendicular with respect to each other.

In some embodiments the channels comprise portions that are of curved shape.

Preferably the thickness of each plate member is $\leqq 20\%$ of a distance between opposed faces of adjacent plate members.

This feature has the advantage that the heat exchanger is of reduced thermal mass relative to a heat exchanger having thicker walls.

More preferably, the thickness of each plate member is $\leqq 10\%$ of a distance between opposed faces of adjacent plate members.

Preferably a spacer is provided between respective opposed plate members thereby to define a portion of a wall of each chamber.

Preferably at least a portion of a wall of a chamber is curved.

This feature of a curved wall has the advantage that a gas-tight pressure retaining seal may be provided using plate members of a thickness lower than required in the case of a plate member not having a wall having a curved portion.

The wall of a chamber may comprise an end formation.

The end formation may comprise at least one substantially flat face.

Alternatively or in addition the end formation comprises at least one curved face.

The presence of a curved face has the advantage over a flat face that the chamber is better able to withstand high pressure without deforming or disintegrating.

The end formation may comprise a portion of at least one of the opposed plate members.

The end formation may comprise an end portion of a first plate element of one plate member and an end portion of an opposed second plate element of an adjacent plate member.

This feature has the advantage that the end formation may be formed by simply bending ends of juxtaposed plate elements of respective adjacent plate members towards one another and joining along an edge.

The end formation may comprise a portion wherein portions of adjacent, opposed plate elements are joined together.

The end formation may comprise an end cap configured to define at least a portion of a wall of a chamber between opposed plate members.

The plate members may be of substantially square or rectangular shape.

Alternatively the plate members may be of substantially circular shape.

Adjacent slots may be in fluid communication via an aperture formed through a plate member.

The aperture may be provided through a central portion of a plate member

Preferably the sorbate outlet is provided by the sorbate inlet.

This feature has the advantage that only one fluid connection need be provided, which acts as both a sorbate outlet and a sorbate inlet.

The slots may be in fluid communication with one another via a manifold.

Preferably an end plate member is provided at each of two opposite ends of the heat exchanger, the end plate members being configured to confer structural rigidity when the heat exchanger is subjected to internal pressure.

Respective end plate members may be connected together by connection means.

The connection means may comprise at least one bolt or bolt-like member.

Respective end plate members may be curved, thereby to define an internal volume of each end plate member, the internal volume being in fluid communication with the chambers.

Respective end plate members may be of a dome or dome-like shape.

Preferably the sorbent material comprises a solid sorbent material.

Preferably the sorbent material comprises a microporous material.

This feature has the advantage that the sorbent material will adsorb a relatively large mass of sorbate per unit volume.

The sorbent material may comprise at least one selected from amongst an active carbon material, a zeolite material, silica gel and a metallic salt.

Preferably the sorbent material is provided in a thermally conductive matrix.

This feature has the advantage of enhancing a rate of heat exchange between the sorbent material and walls of the chamber.

Preferably the thermally conductive matrix comprises graphite.

This has the advantage that thermally conductive matrix is inert to the sorbent material. It further has the advantage that the thermally conducting matrix is inert to the sorbate material.

Preferably the thermally conductive matrix comprises expanded natural graphite.

Preferably the thermally conductive matrix comprises a metallic foam material.

Preferably a thermally conductive member is provided in at least one chamber, the thermally conductive member being arranged such that it is capable of conducting thermal energy between a plate member defining a wall of the chamber and a sorbent material provided within the chamber.

The thermally conductive member may comprise a corrugated sheet of material, at least a portion of a face of the thermally conductive member being provided in mutual abutment with a major face of a plate member.

This feature has the advantage that the thermally conductive member can be conveniently inserted between the plate members defining the chambers during assembly of the heat exchanger.

Preferably opposed faces of the thermally conductive member are provided in mutual abutment with opposed major faces of respective adjacent plate members defining opposed walls of a single chamber.

This has the advantage of increasing a rate of thermal transfer between the sorbent material and the plate members.

Alternatively or in addition the thermally conductive member may comprise at least one fin protruding into the at least one chamber from a wall of the chamber. Preferably the thermally conductive member comprises a plurality of fins protruding into the at least one chamber.

Preferably the thermally conductive member comprises aluminum.

Preferably a sorbate material is provided in each chamber.

Preferably the sorbate material comprises ammonia.

In a second aspect of the present invention there is provided a method of cooling a reservoir connected to a heat exchanger comprising the steps of: providing a heat exchanger according to the first aspect of the invention; providing a sorbate material in at least one chamber of the heat exchanger; cooling the sorbent material by passing a thermal fluid at a first temperature through channels of the heat exchanger, thereby to reduce a pressure of sorbate in the at least one chamber and induce evaporation of sorbate in the reservoir; subsequently heating the sorbent material by passing a thermal fluid at a second temperature through the channels of the heat exchanger thereby to induce vaporisation of the sorbate from the sorbent material.

In a third aspect of the present invention there is provided a method of cooling a reservoir in a sorption device comprising the steps of (a) providing a plurality of plate members, each plate member having at least one fluid channel provided therein, the at least one channel having a channel inlet and a channel outlet;

(b) providing a thermal fluid inlet in communication with the at least one channel inlet and a fluid outlet in communication with the at least one channel outlet;

(c) providing a plurality of chambers between the plate members, the chambers being provided in fluid isolation from the at least one channel;

(d) providing a sorbent material in each of the chambers;

(e) providing a sorbate inlet and a sorbate outlet in fluid communication with the chambers;

(f) connecting the sorbate inlet and sorbate outlet to a reservoir thereby to form a closed system;

(g) connecting the fluid inlet and fluid outlet to a fluid source;

(h) providing a quantity of sorbate in each chamber;

(i) passing a thermal fluid at a first temperature through the channels thereby to cause adsorption of the sorbate on the sorbent material;

(j) passing a thermal fluid at a second temperature through the channels thereby to cause desorption of the sorbate from the sorbent material.

Preferably the method further comprising the steps of repeating steps (i) and (j) thereby to cause repeated cooling and heating of the reservoir.

Embodiments of the invention will now be described by way of example only and with reference to the accompanying drawings.

Figure 1:
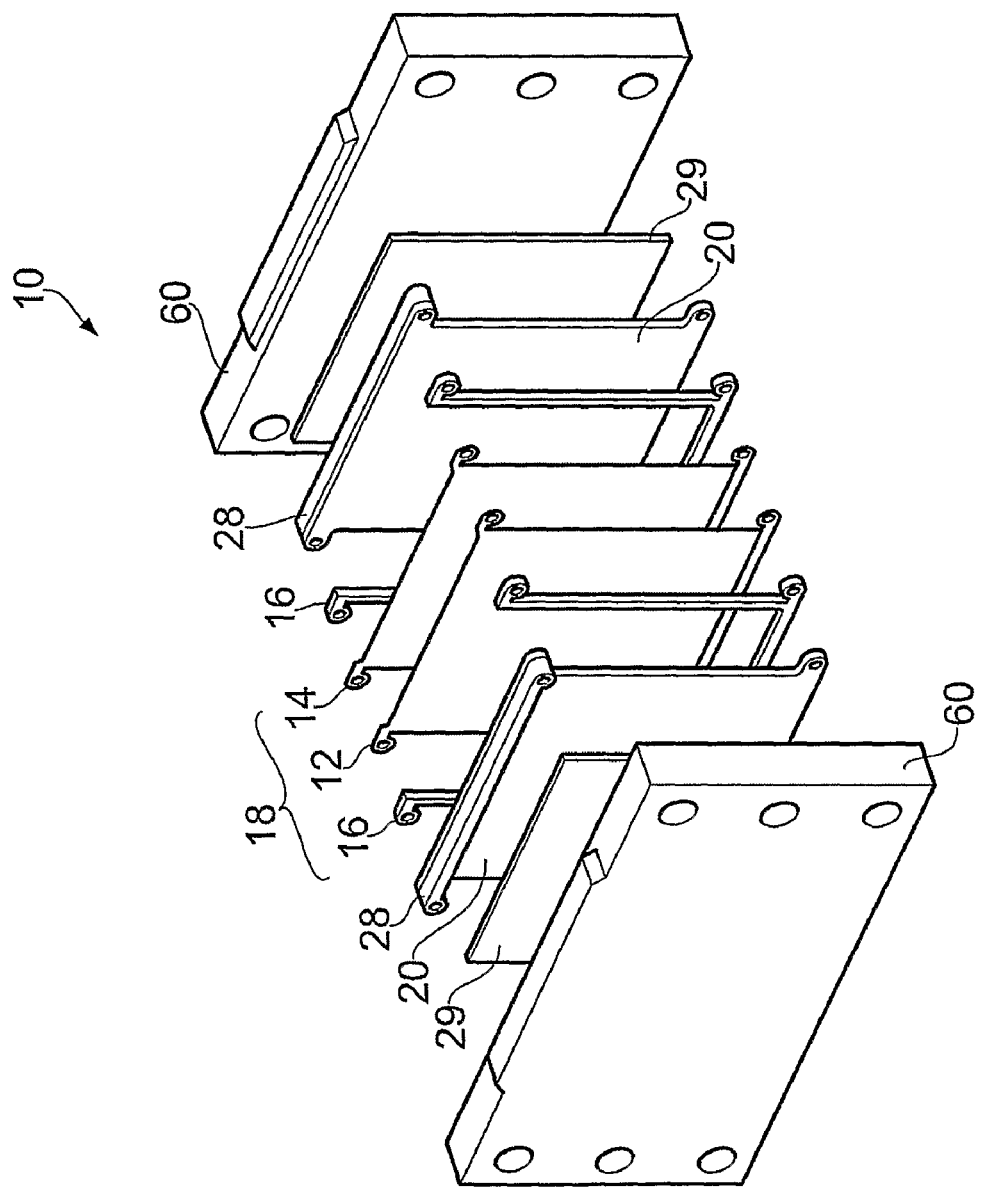
FIG. 1 is an expanded view showing a representative sample of plate member layers that may be repeated to form a heat exchanger according to a first embodiment of the present invention.
Figure 2:
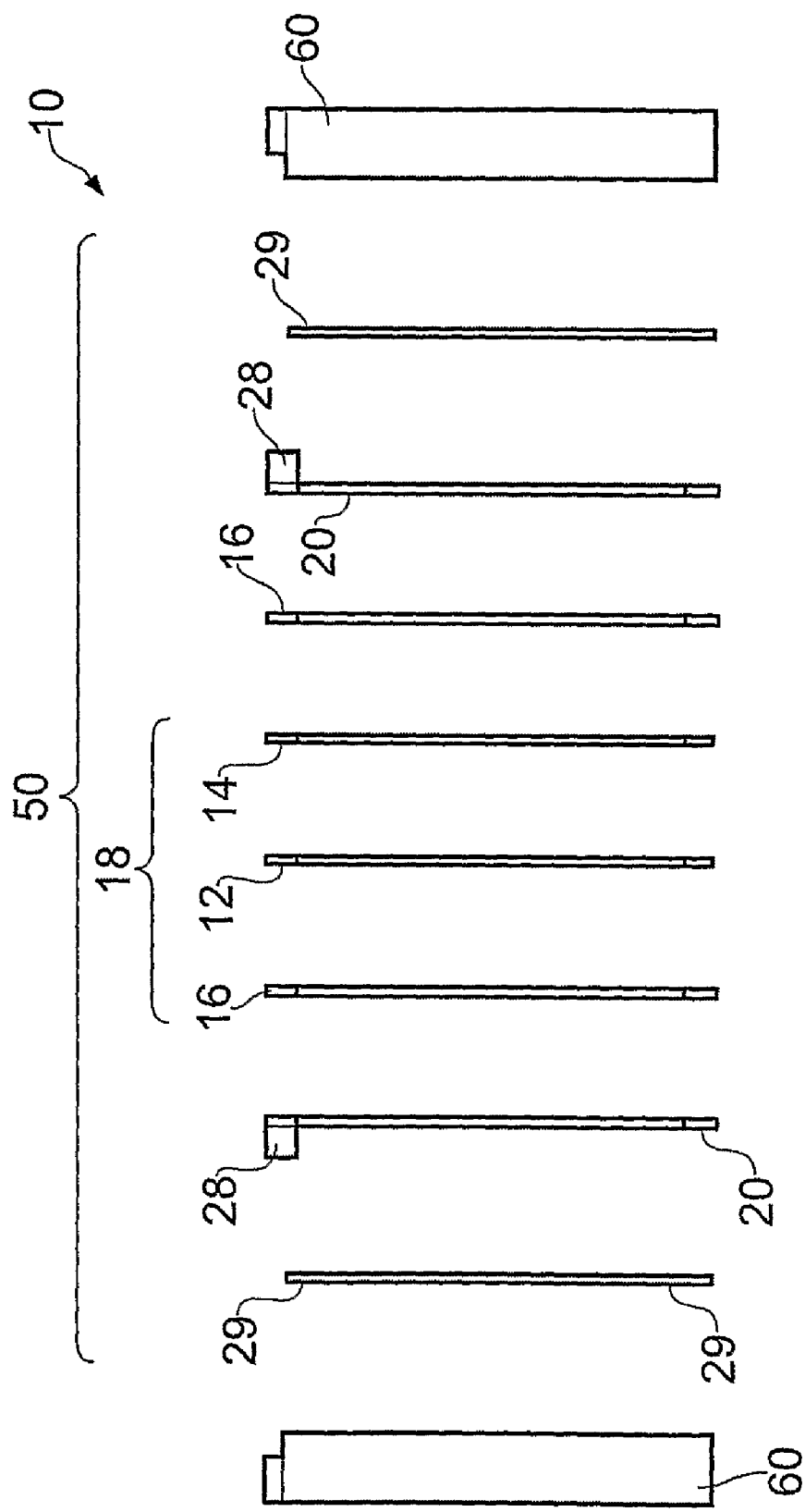
FIG. 2 is a side view of the representative sample shown in FIG. 1.

According to a first embodiment of the invention, a flat plate heat exchanger 10 is provided as shown in FIG. 1 (perspective view) and FIG. 2 (side view).

The heat exchanger 10 comprises a stainless steel etched plate element 12, 0.7 mm in thickness, sandwiched between a stainless steel plain plate 14, 0.1 mm in thickness and a "U" shaped spacer 16, 4 mm in thickness.

The spacer 16 is laser cut from a stainless steel sheet. The etched plate element 12, plain plate element 14 and spacer 16 form a basic plate member unit 18 that is repeated a number of times across the length of the heat exchanger 10. For clarity, only a single unit 18 is shown in FIGS. 1 and 2.

When the heat exchanger is used as a sorption generator, the spacer 16 is packed with active carbon sorbent (not shown). A number of these repeat units 18 are nickel brazed together in forming a complete exchanger 10. When sufficient units 18 (between 20 and 25 for most applications including mobile air conditioning) are assembled, an additional spacer 16 is placed next to a terminating plain plate element 14, to ensure that both ends of the heat exchanger terminate in a U-shaped spacer 16.

End plates 20, each 3 mm in thickness, are then brazed to the U-shaped spacers 16. The end plates 20 are in turn brazed to 10 mm thick end steps 28. End plates 20 contain the refrigerant within the unit whilst end steps 28 provide a face for an o-ring which provides a seal between the upper face of the heat exchanger 10 and a flange 68 shown in FIG. 11, thereby preventing leakage of sorbate to the environment.

Thermal insulating sheets 29 are placed in juxtaposition with the end plates 20 and inhibit heat transfer to thermally massive pressure flanges 60 which are attached at each end of the resulting structure. Pressure flanges 60 act to prevent the exchanger 10 from distorting or exploding when the exchanger 10 is pressurised in use. In some embodiments of the invention the pressure flanges 60 are tied together by bolts to provide further structural integrity, in addition to brazing of components of the exchanger 10 to one another.

Figure 3:
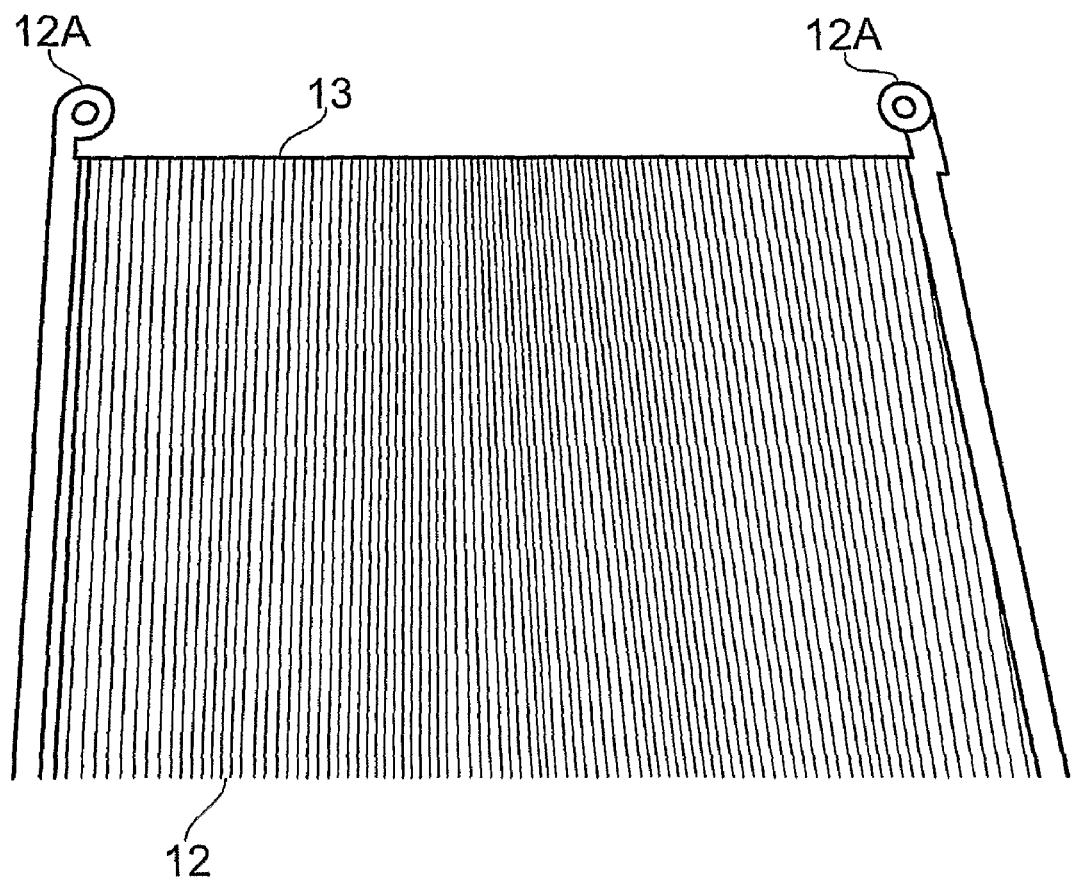
FIG. 3 shows an etched plate member for use in the heat exchanger of FIGS. 1 to 2.

FIG. 3 shows an etched plate element 12 before installation in the heat exchanger. Etched plate element 12 is formed from a stainless steel plate and has parallel etched channels 13 extending the length of the etched plate element 12. The channels 13 are open at top and bottom ends of the plate in order to allow inflow and outflow of heat transfer fluid. Etched channels 13 are 0.5 mm wide and 0.5 mm deep, being spaced at pitch of 1 mm across the plate 12. The channels 13 are closed when plain plate 14 is placed over the channels 13.

It will be appreciated that whilst the channels according to the present embodiment are formed by a process of etching, a variety of techniques could be used to form the channels. For example, the channels may be formed by casting, rolling, pressing, machining, by addition of elements to a plain plate element to define walls of the channels between plates elements, or any other suitable technique.

Protrusions 12A having apertures therethrough are provided at corners of plate element 12. The apertures allow alignment of the plates with neighbouring plates by passing rods through the apertures and fixing the positions of the rods relative to one another by means of a jig. Once the plates have been brazed, the rods and protrusions 12A can be removed.

Figure 4:
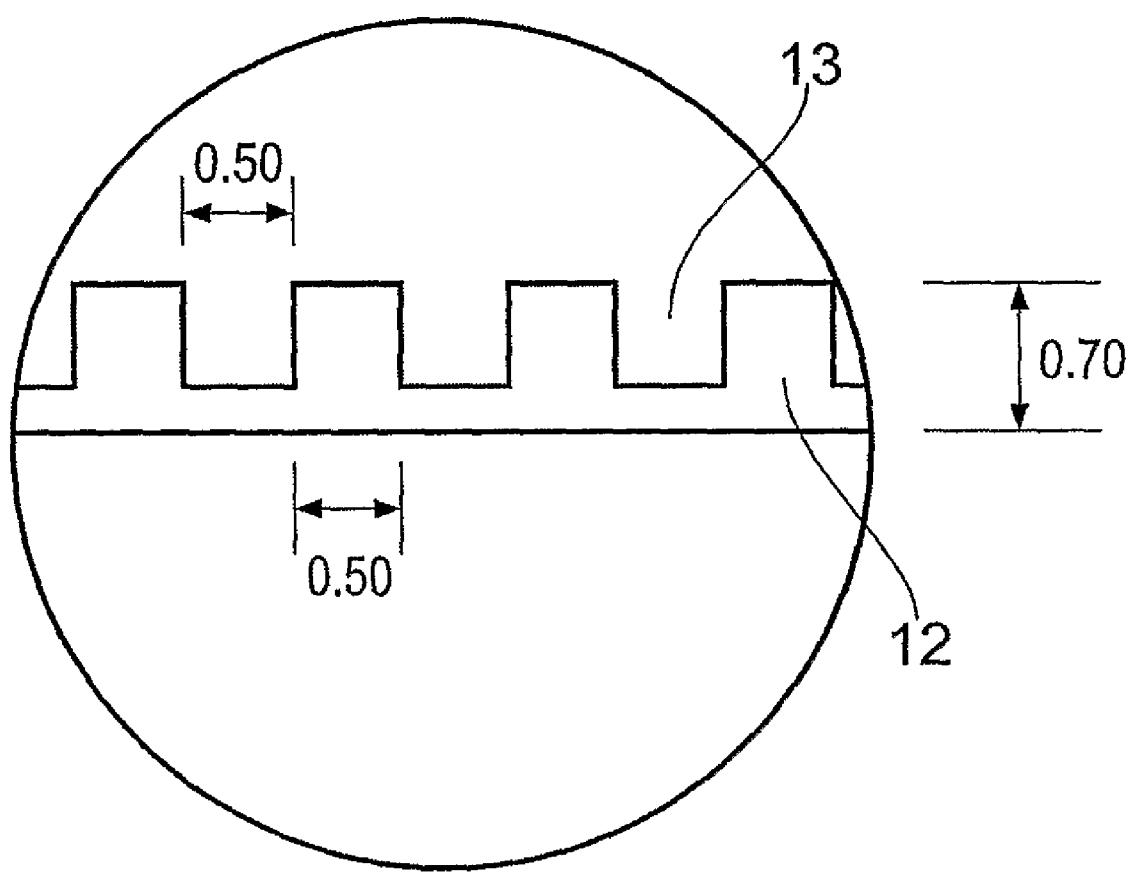
FIG. 4 is a cross-sectional view of the etched plate member of FIG. 3.

FIG. 4 shows a cross-sectional view of etched plate element 12 showing the 0.5 mm wide channels. The channels have a pitch of 1 mm, ie the channels are provided a distance of 0.5 mm apart.

Figure 5:
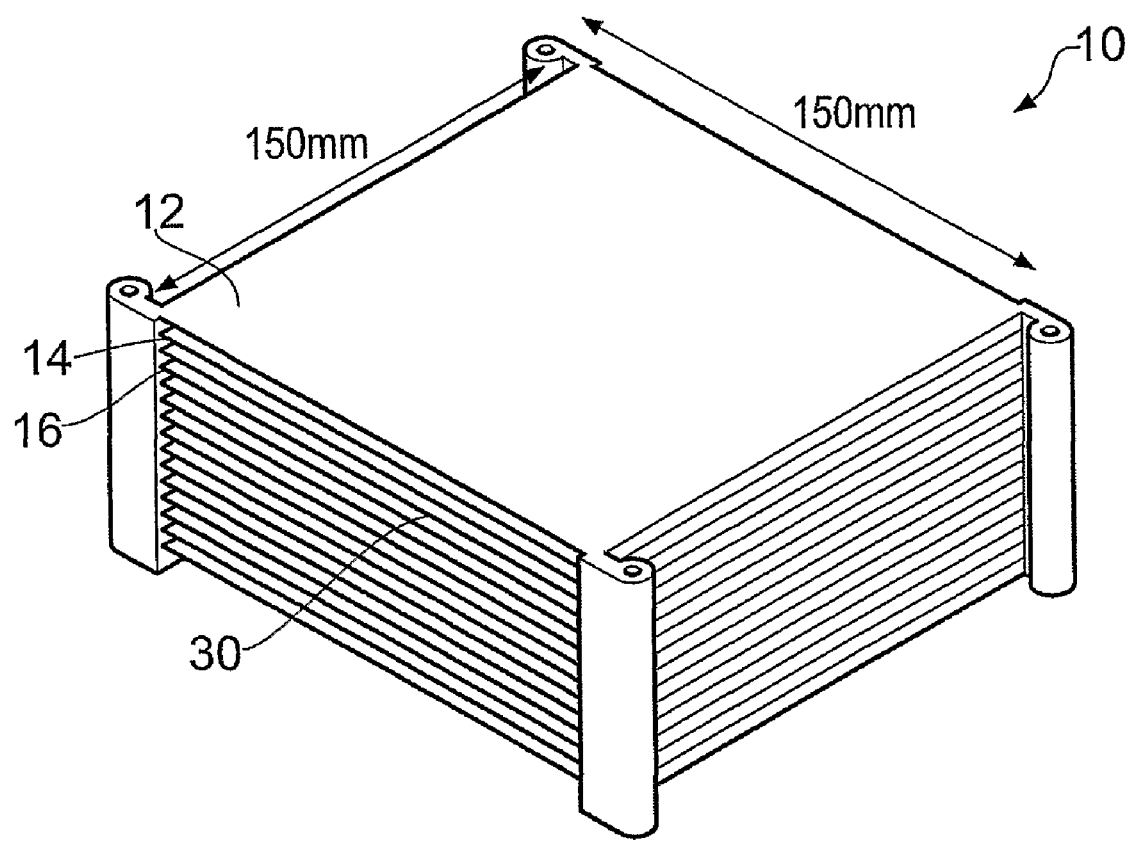
FIG. 5 is a schematic illustration of a heat exchanger constructed in accordance with the first embodiment of the present invention.

An alternative view of the heat exchanger 10 is shown in FIG. 5. As before, the exchanger 10 comprises a number of thin stainless steel etched plate elements 12 brazed to plain plate elements 14 and spacers 16. The spacers 16 define 4 mm slots 30 to be filled with adsorbent, preferably active carbon, when the heat exchanger is used as a sorption generator.

When the heat exchanger of the present invention is used as a generator in a sorption device, heat transfer fluid is alternately used to heat and cool the sorbent material. Consider an initial stage in which the heat transfer fluid heats the sorbent and drives the sorbate out of its adsorbed phase. The sorbate flows to a receiver where it condenses and rejects heat to its environment. Heat transfer fluid is then used to cool the generator back to ambient temperature and the sorbate is readsorbed, which in turn reduces the system pressure. As a result, the liquid in the receiver boils and heat is extracted from the environment to produce an external cooling/refrigeration effect.

It is clear from the above that the generator system must undergo thermal cycling as it is alternately heated and cooled. This gives rise to a number of engineering requirements for its construction, a number of which can be met by a plate heat exchanger designed in accordance with embodiments of the present invention. As previously stated, chemical reactors based on a plate design of heat exchanger are known in the prior art, in which a thermal fluid is used to remove or input heat of reaction. Such prior art constructions concentrate on liquid-liquid, liquid-gas or gas-gas heat exchange, which presents far less of a challenge to engineering design than solid-liquid heat exchange, as addressed by the present invention.

The requirements for heating and cooling a solid sorbent material are markedly different, leading to a significantly different design of heat exchanger than known in the prior art. For example, such prior art heat exchangers are not subject to the stresses of thermal cycling, which again relaxes many design constraints on prior art heaters.

A basic requirement of the heat exchanger is the efficient transfer of heat between the heat transfer fluid and the sorbent material. In the prior art, suitable channel design ensures that flowing liquids can be in thermal contact over a large surface area during the heat exchange process, ensuring efficient heat transfer. Such a straightforward design feature is not available if one material is solid. The use of solid adsorbents also introduces problems associated with the generally low thermal conductivity of microporous solid adsorbents.

In some embodiments of the invention efforts are made to reduce the thermal mass of metal. This is to reduce the amount of energy used during thermal cycling, in order to improve the efficiency of the system.

Clearly, by increasing the width of the channels 13 in the plane of the plate element 12, and/or increasing the number of channels 13, the heat transfer area may be increased. However, it will be appreciated that a trade-off between the structural stability of the etched plate element and the heat transfer capability of the heat exchanger must be reached. In addition, the pressure drop across a channel must be considered, for example the pressure drop due to friction. The amount of pressure drop increases as the cross-sectional area of a channel decreases.

Furthermore, as the channel cross-sectional area decreases, the hydraulic diameter decreases and the heat transfer coefficient increases. The thermal mass of heat transfer fluid within the unit is also decreased. However, these factors must be balanced against the fact that the risk of a channel becoming blocked in service increases as the cross-sectional area of a channel decreases.

Each channel has the same pressure drop since the channels are of identical dimensions. This helps to ensure an even flow of fluid through the generator.

Ideally a heat exchanger, such as that described in relation to the present invention, should have zero thermal mass and an infinite heat exchange area. Solid sorbents tend to have low thermal conductivity and measures taken to improve their conductivity are limited. For example, active carbon has a microporous structure, which allows greater ingress of the sorbate. On the other hand, micropores tend to result in low conductivity.

An alternative approach is to pack the sorbent material in such a way that the maximum conduction path through the material is relatively short.

Thus, in some embodiments of the present invention a plurality of fins are provided on at least one opposed wall of adjacent plate members defining sidewalls of a chamber. The fins protrude into the volume between plate members, thereby improving a rate of transfer of thermal energy between fluid in the channels of the plate members and sorbent material in the slots 30.

In some embodiments of the invention the channels 13 are in the form of substantially parallel, straight channels running between opposed ends of the plate elements 12. In some embodiments the channels are provided on the face of only one plate.

In some embodiments channels are provided on each of the opposed faces of a pair of plate elements 12.

From the numerous sorbate-sorbent systems available, the preferred sorbate material for mobile applications is ammonia. Water is a commonly preferred sorbate for regenerative sorption cycling, and it has a number of advantages. It has the highest sorbate latent heat, is non-toxic and has no need for high-pressure containment vessels. On the other hand, leakage of air into a closed cycle sorption system has a deleterious effect on performance and yet is difficult to avoid, particularly in sub-atmospheric systems.

Furthermore, due to the low density of water vapour, systems operating with water as sorbate require careful component design to avoid significant pressure drops. The poor diffusion of water vapour can also lead to very bulky and therefore expensive equipment (per unit of cooling). For many applications therefore, ammonia is potentially the better material. Although it is toxic, ammonia has a high vapour pressure and is, in many respects, easier to work with than sub-atmospheric refrigerants. High-pressure ammonia-based systems have the capability of achieving sizes of $0.001$ $m^3$ per kW, offering the potential of equipment that is at least an order of magnitude more compact than water based systems. Such equipment is therefore of lower cost and also more robust. These are prime considerations for a commercially viable mobile air conditioning system. Accordingly, one preferred embodiment of the invention operates with ammonia as a sorbate.

In a number of ways it is perhaps surprising that ammonia should be preferred for an air conditioning, refrigeration, heat pump or thermal transformer system. Due to its lower latent heat compared with water, an ammonia-based sorption system may be less efficient than ones using water as a sorbate and accordingly, with its focus on efficiency, it is uncommon in the prior art to base a practical heat exchange system on ammonia.

However, ammonia being a high-pressure refrigerant, it is less subject to mass transfer limitations that would increase the cycle time and thereby the size of a system to deliver a given cooling or heating power.

By heat exchange system is included an air conditioner, thermal transformer, refrigerator or heat pump.

It should be noted that alcohol is an alternative sorbate material. Alcohol, like ammonia and water, has a high latent heat, is commonly available and is environmentally friendly. The alcohols however are still at sub-atmospheric pressure and so share, to a lesser degree, some of the disadvantages of water. In short, they also are not preferred for use in mobile systems.

The sorbent should be a solid material, such that it holds its position within the plate members of the generator. Solid adsorbents can be more readily engineered to provide the required adsorption properties than liquid adsorbents. Silica gels, zeolites and metallic salts such as $BaCl_2$ may be used, although active carbon is preferred since good performance may be achieved at reasonable cost. Furthermore silica gel is unstable with ammonia and therefore less preferable than active carbon.

In order to achieve a high cooling power density, the sorbent must be extremely microporous in order to permit high permeability of the sorbent by the sorbate. The sorbent should also have a high bulk density in order to improve the cooling or heating power per unit volume. These are inherently conflicting requirements, however. Currently available forms of active carbon offer the best compromise, providing good performance at relatively low cost. It is also possible to improve the thermal conductivity of active carbon by mixing it with graphite, and employing such a mixture as a sorbent material. It is anticipated that zeolite compounds and/or metal halide salts in host matrices, and other types of solid sorbent with increasingly desirable properties and suitability for this application will continue to be developed.

The ratio of the thickness of the stainless steel plate elements to monolithic carbon is ideally about 10%. Thus, for a rapid cycle constraint (high thermal transfer), where the monolithic carbon layer is typically equal to or less than 4 mm), the plate elements should have a maximum thickness of 0.4 mm in total for each pair of plate elements.

The thickness of the plate elements is a trade off between thicker plate elements, which can better withstand the high pressures of an ammonia based system, and thinner plate elements, which have lower thermal mass and are therefore associated with reduced energy wastage when heating and cooling the plates each cycle.

In some embodiments of the invention, the plate elements are thinner than would otherwise be permitted since the generator design in those embodiments allows equalisation of pressure between the heat transfer fluids and the sorbate, thus reducing a pressure imbalance and subsequent deformation of the plate members by flexure.

Consideration of the effect of thermal mass of the heat exchange components is a new design parameter for air conditioning systems, refrigeration systems, thermal transformers and heat pumping systems, which contributes to one aspect of the novel design of the present invention. Low thermal mass has not been a consideration in the design of conventional prior art air conditioning systems since these systems operate on a continuous cycle. Accordingly, there has been no need to consider the effect of thermally cycling the heat exchanger itself.

The heat transfer fluid may be any of a number of materials. Water or a mixture of water and glycol is strongly preferred, mainly due to their relatively low viscosity, high thermal conductivity and high specific heat capacity. At least one of these fluids is generally readily available as a heated waste product from the engine water cooling jacket of a vehicle. Other applications might use an oil or other suitable heat transfer fluid, for example applications in which the driving temperature is higher than the normal boiling point of water.

When used with ammonia sorption systems, the generator must be able to withstand safe working pressures of up to 35 bar (3.5 MPa), assuming the generator is operating with ammonia condensing at 65 Celsius. In this respect, the plate member design is further advantageous for application as a generator.

Figure 6:
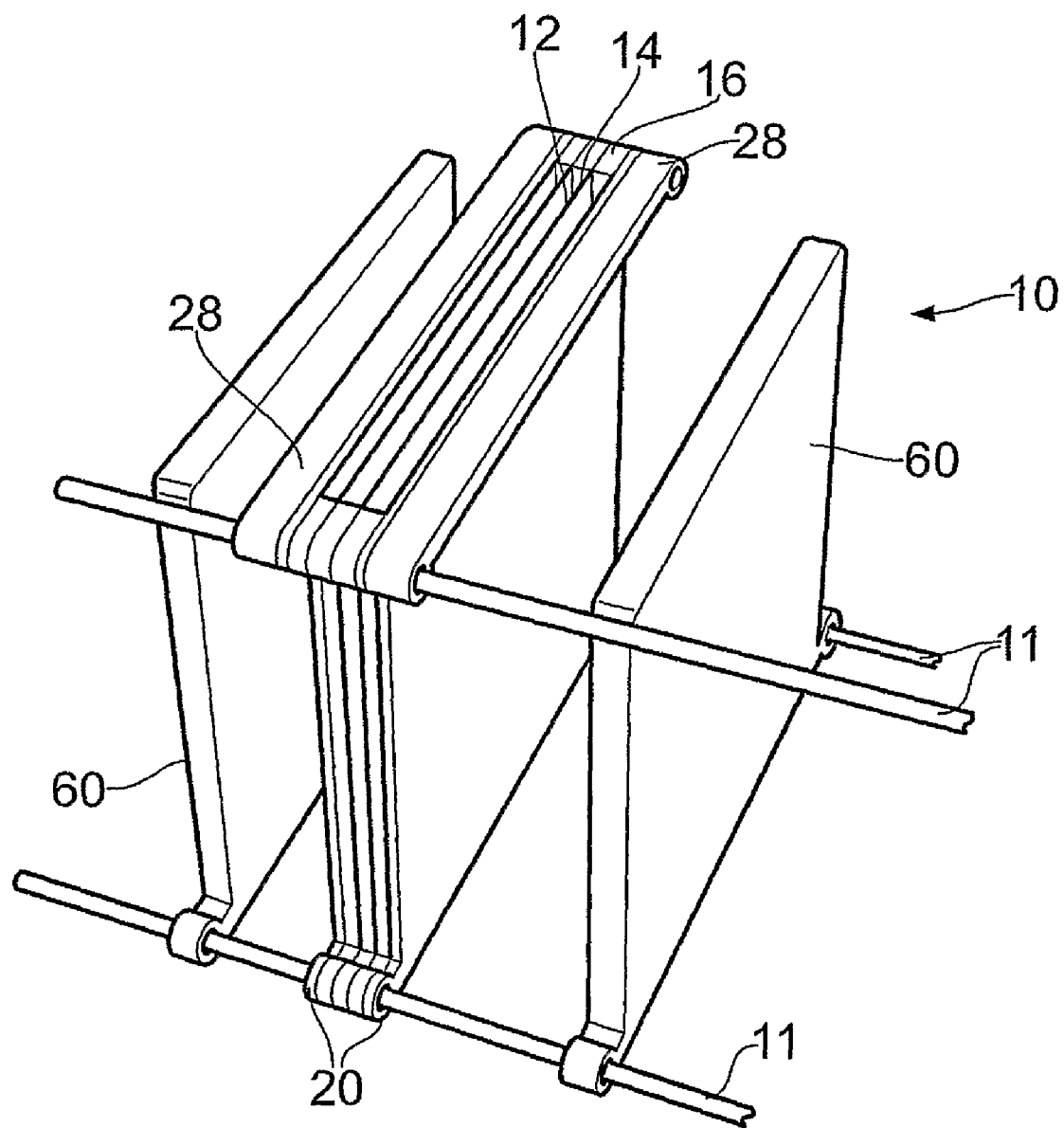
FIG. 6 is an exploded view of a heat exchanger according to the first embodiment of the invention.

FIG. 6 shows a number of components mounted on support rods 11 ready for brazing together to form a heat exchanger. The components include plate elements 12, 14, spacers 16, end plate members 20 and end steps 28.

Figure 7:
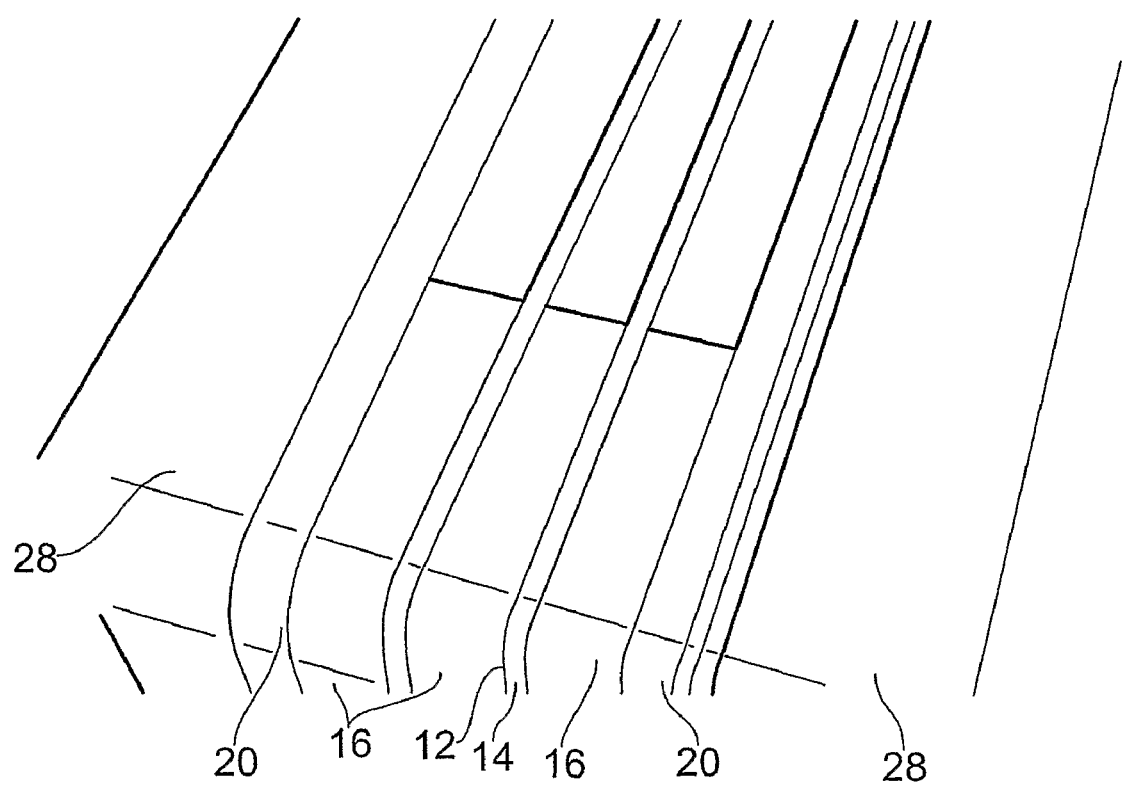
FIG. 7 is an assembled view of a portion of a heat exchanger according to the first embodiment of the invention.
Figure 8:
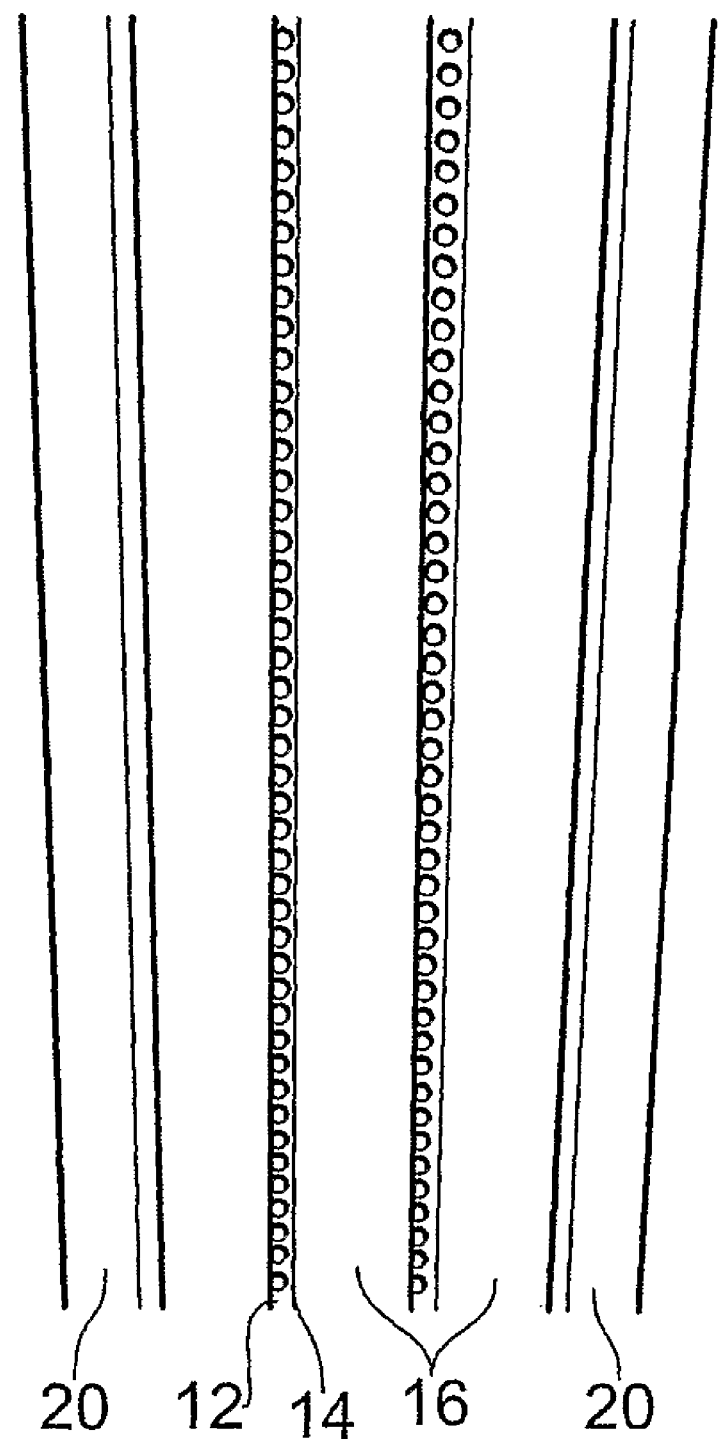
FIG. 8 is a side view of a heat exchanger according to the first embodiment of the invention.

FIGS. 7 and 8 show the components 12, 14, 16, 20, 28 of FIG. 6 following a brazing operation to form the heat exchanger. The plate elements 12, 14 act as strengthening webs and so adopt a very rigid structure in the plane of the plate members. That is, flexure or bulging of the plate members in a direction away from the main body of the heat exchanger and in any direction in the plane of the members is restrained. This design of heat exchanger permits operation at high internal pressure, such as required for an ammonia sorbate system, with relatively little further strengthening and with a relatively low thermal mass. Such further strengthening is only needed to resist forces out of the plane of the plate members, as illustrated by the use of pressure flanges 60 in FIG. 11. These are important features of some embodiments of the invention.

Figure 9:
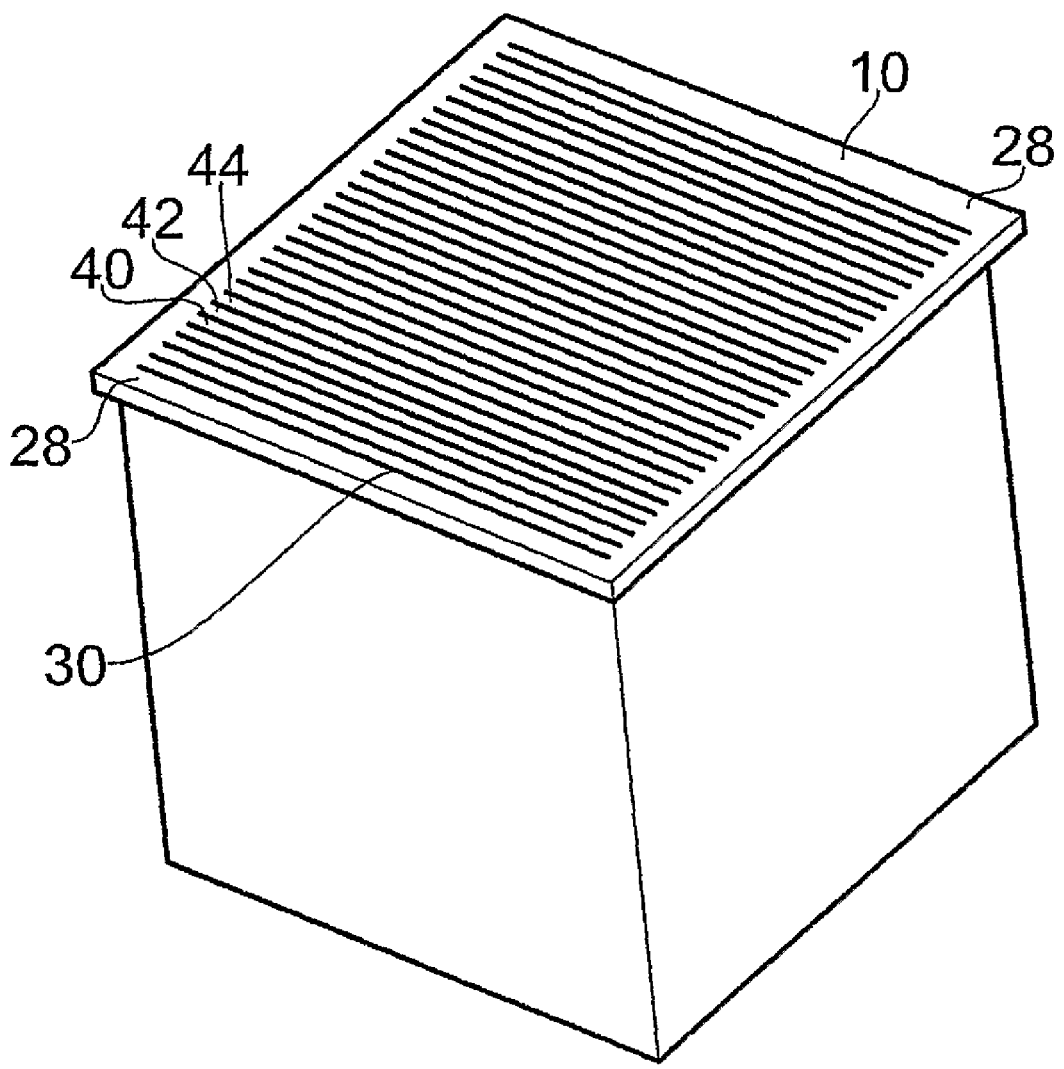
FIG. 9 is a perspective view of a heat exchanger according to the first embodiment of the invention.

FIG. 9 shows the heat exchanger 10 of FIG. 5 in an upright orientation ready for filling of slots 30 with sorbent material.

Figure 10:
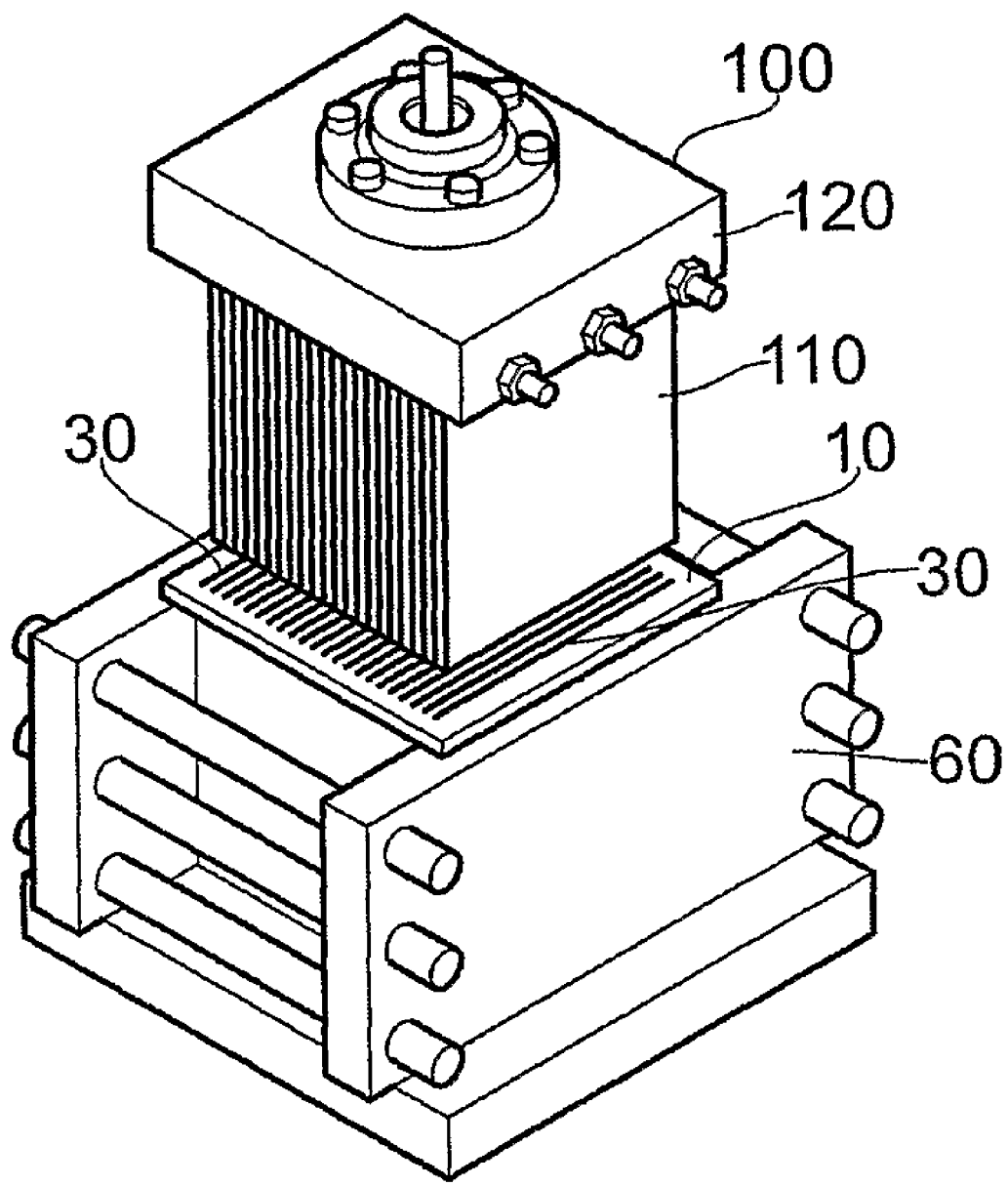
FIG. 10 shows apparatus used to pack sorbent material into a heat exchanger according to the first embodiment of the invention.

FIG. 10 illustrates a process of filling of the slots 30 with sorbent material. A plunger 100 is provided having a plurality of plates 110 projecting from a plunger top plate 120. The size and positions of the plates 110 correspond to the slots 30 of the heat exchanger 10. Sorbent material is poured into the slots 30, followed by a process of compressing the sorbent material by insertion of the plates 110 of the plunger 100 into the slots 30.

Figure 11:
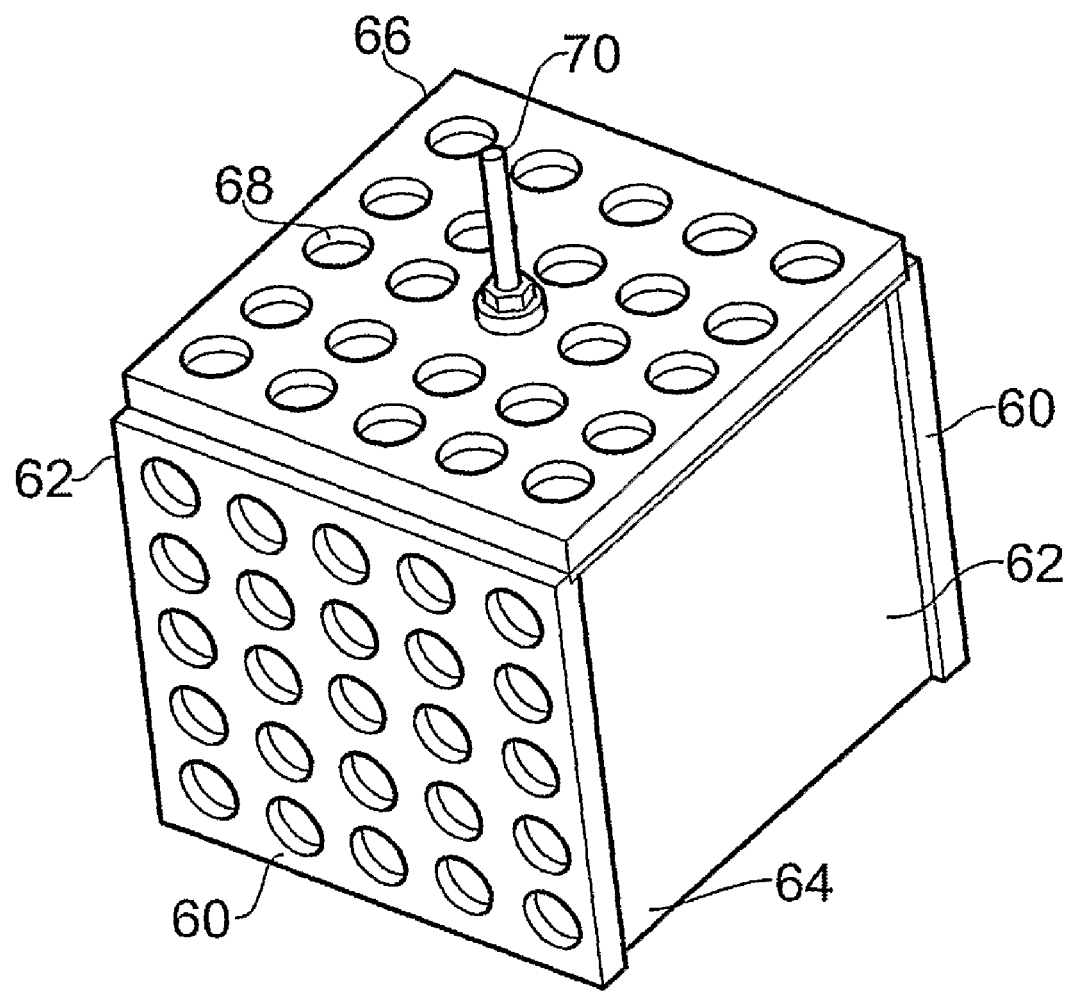
FIG. 11 shows a heat exchanger according to the first embodiment of the invention with manifolds fitted.

FIG. 11 illustrates a heat exchanger system of the first embodiment of the heat exchanger adapted for use with an ammonia system. Pressure flanges 60 are provided at opposite ends of the system, oriented substantially parallel to the plate member units 18 in order to maintain structural integrity of the heat exchanger 10 when subject to high internal pressure. Pressure flanges 60 are tied together by external bolts (not shown).

Water manifolds 62 are connected at the two remaining side faces An inlet pipe 64 is provided to the base corner of one side, with a corresponding outlet 66 at the top opposing corner of the opposing side. The top face of the exchanger is reinforced with an ammonia flange 68. The ammonia flange includes a connection 70 to a receiver vessel (not shown), in which the ammonia will evaporate and condense as the sorption device is thermally cycled.

Figure 12:
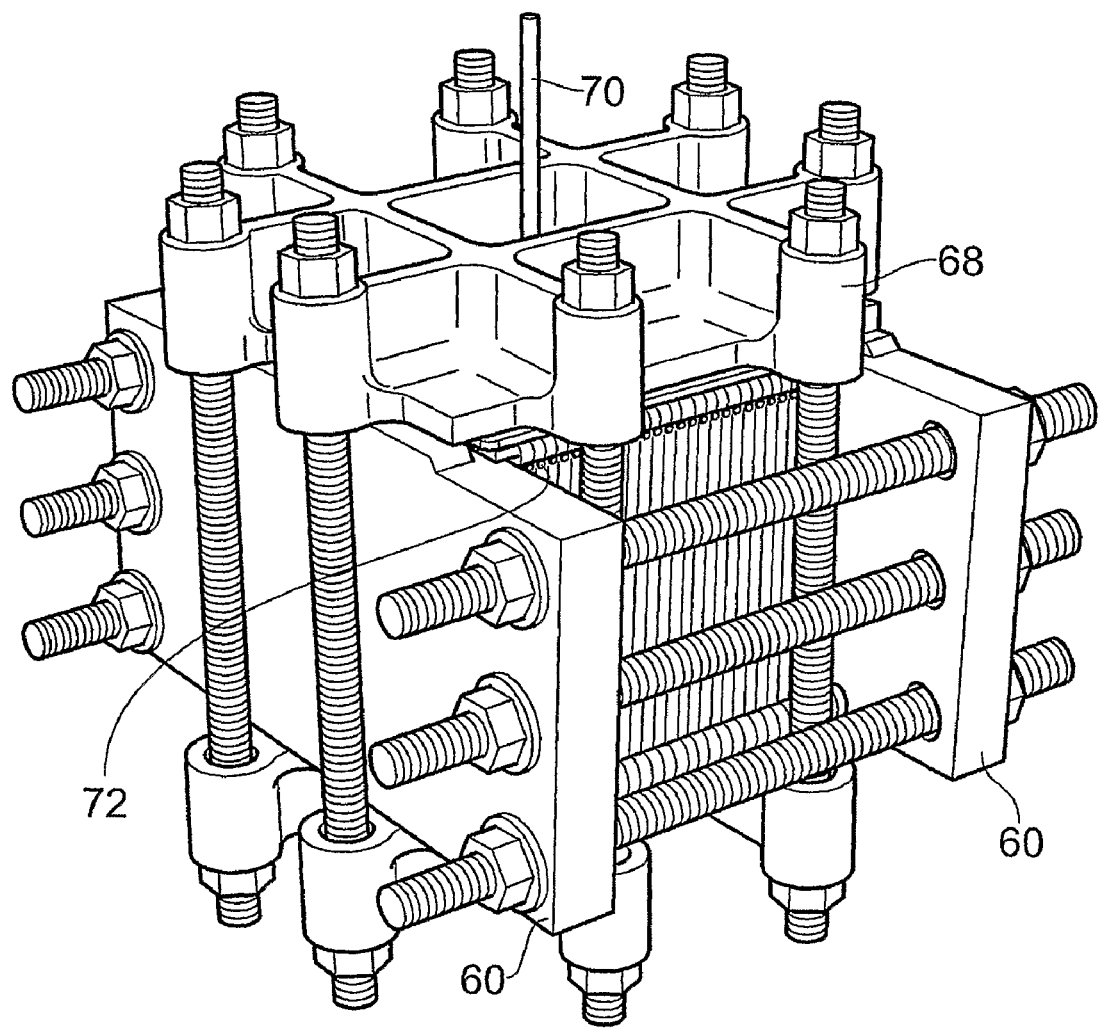
FIG. 12 shows a perspective view of a heat exchanger according to the first embodiment of the invention with water manifold removed.

FIG. 12 is a further perspective view of the heat exchanger of FIG. 11. In this figure, an array of water pipes 72 can be seen. Each of the water pipes 72 is associated with a different respective plate member and is arranged to supply water to the channels of its respective plate member. A water pipe is provided on each of opposite sides of a plate member. The water pipe on one side is provided at one end of the plate member, whilst the water pipe on the other side is provided at the opposite end of the plate member. Thus, in the orientation of FIG. 12, the water pipes on the side shown are provided at upper ends of the plate members. The water pipes on the opposite side are provided at lower ends of the plate members.

Figure 13:
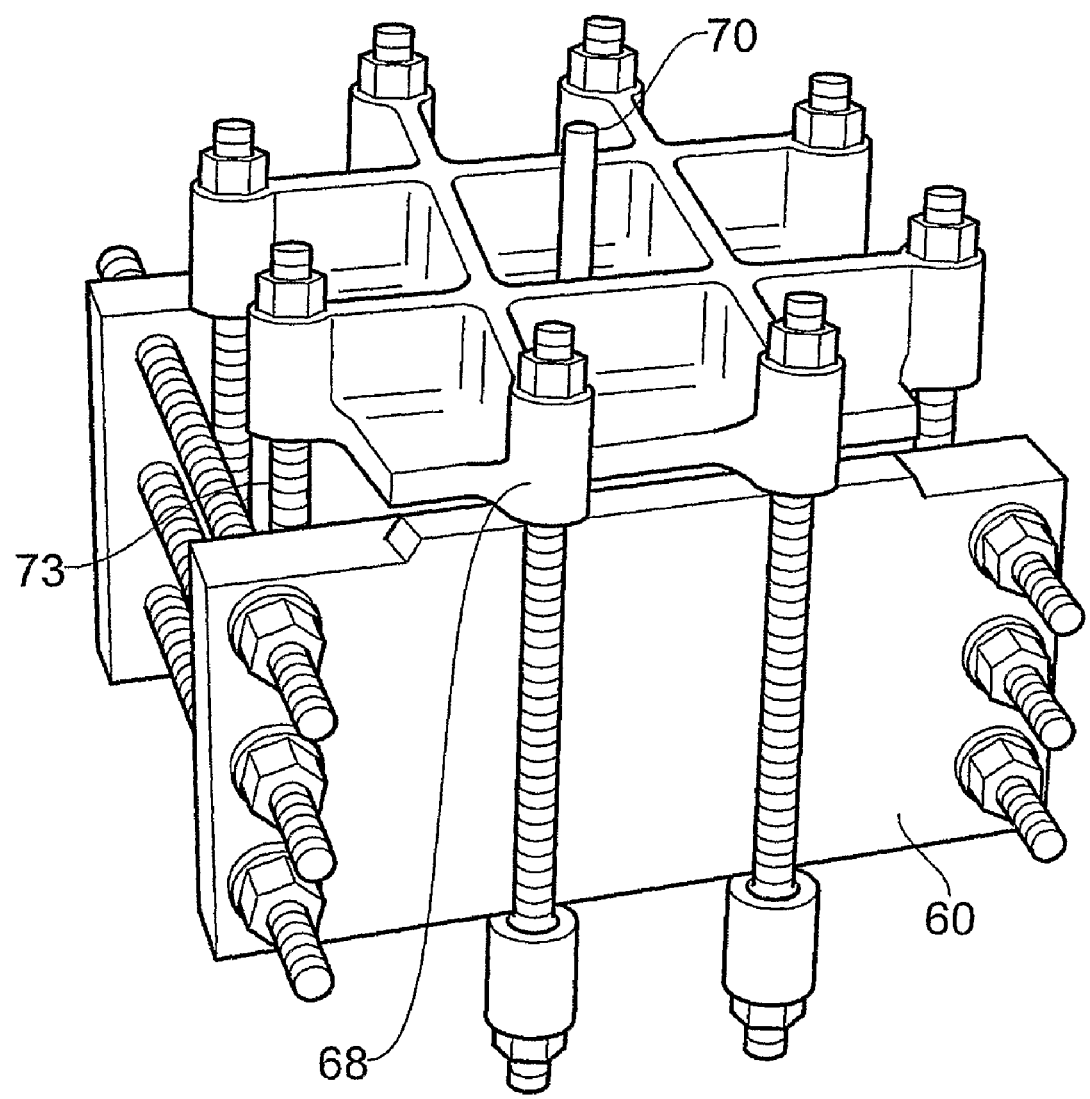
FIG. 13 shows a perspective view of a heat exchanger according to the first embodiment of the invention with water manifold present.

FIG. 13 shows the heat exchanger of FIG. 12 with a water manifold 73 connected to the structure.

Figure 14:
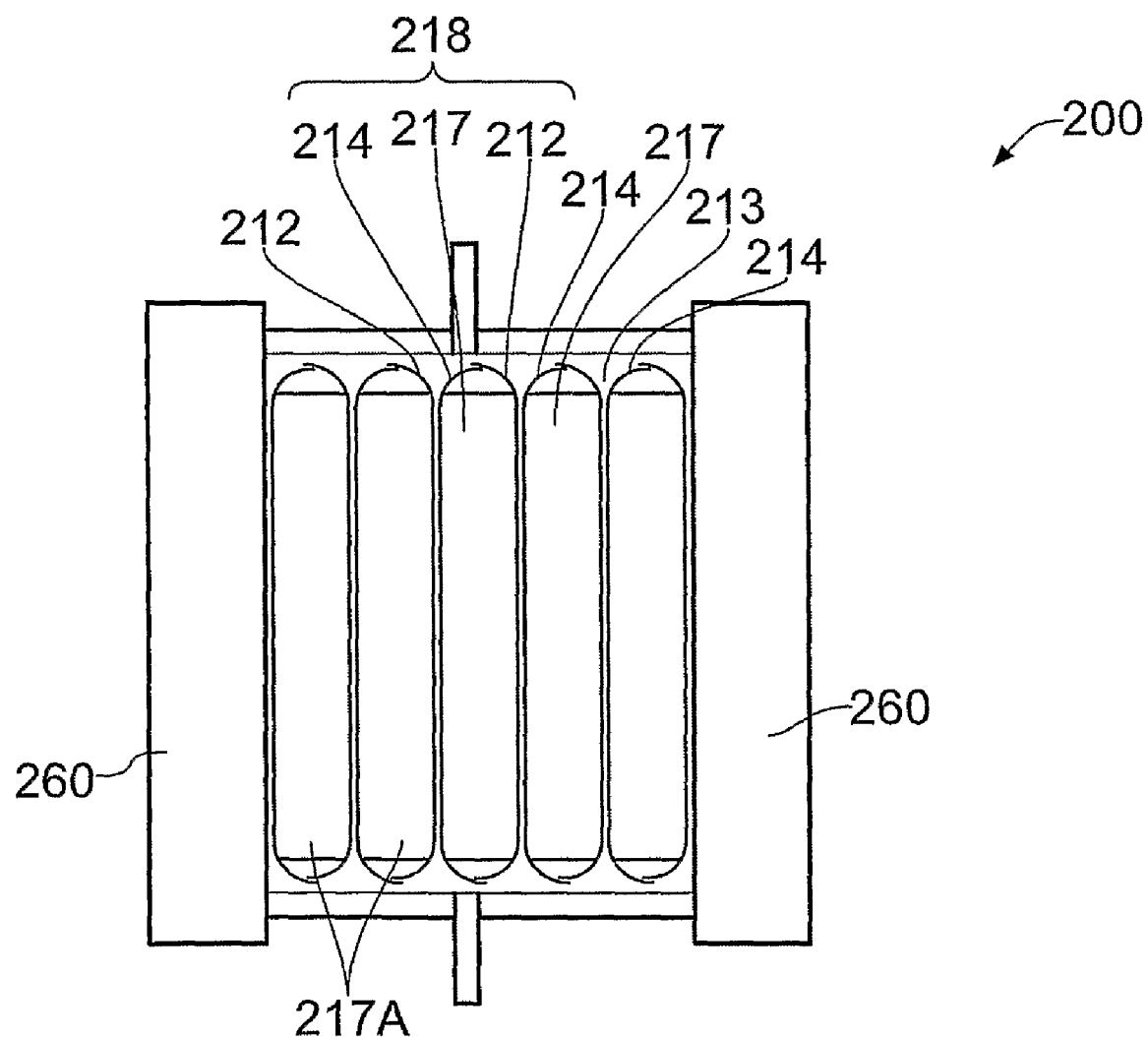
FIG. 14 shows a cross-sectional view of a heat exchanger according to a second embodiment of the invention.

FIG. 14 shows a plate heat exchanger 200 according to a second embodiment of the invention. In the second embodiment, a plurality of plate member units 218 are provided. Plate member units 218 have an etched plate element 212 and a plain plate element 214, which together define a chamber 217A containing a sorbent material 217. It will be appreciated that closed channels are formed between plate member units 218 when plate member units 218 are joined together to form a stack of plate member units. Open channels 213 provided on etched plate element 212 of one plate member unit 218 are closed by abutment with a plain plate element 214 of an adjacent plate member unit 218.

Each plate member unit 218 is closed at its top and its base by bending of the etched plate element 212 and plain plate element 214 towards one another and joining the free ends of the plates elements 212, 214 to one another. A gas-tight chamber 217A may be provided around the sorbent material 217 by further sealing gaps between the sides of the plate elements. Gas-tight chambers 217A so formed are in fluid communication with a sorbate inlet/outlet thereby to allow sorbate to flow into and out of the chambers 217A.

The presence of curved end formations enables the heat exchanger to better withstand the high pressures of the system compared with 'flat' end formations of a similar thickness. Consequently, this design is more suitable for incorporation in a high-pressure ammonia-based sorption generator.

It will be appreciated that in variations of the second embodiment of the invention, instead of folding and joining plate elements 212, 214, curved end caps could be provided and joined to respective ends of etched and plain plate elements 212, 214 in order to form gas-tight chambers around the sorbent material 217.

Pressure flanges 260 are provided at opposite ends of the system, oriented substantially parallel to the plate member units 218 in order to maintain structural integrity of the heat exchanger 200 when it is subject to high internal pressure. The pressure flanges may be secured to one another by bolts passing between the flanges 260.

Figure 15A:
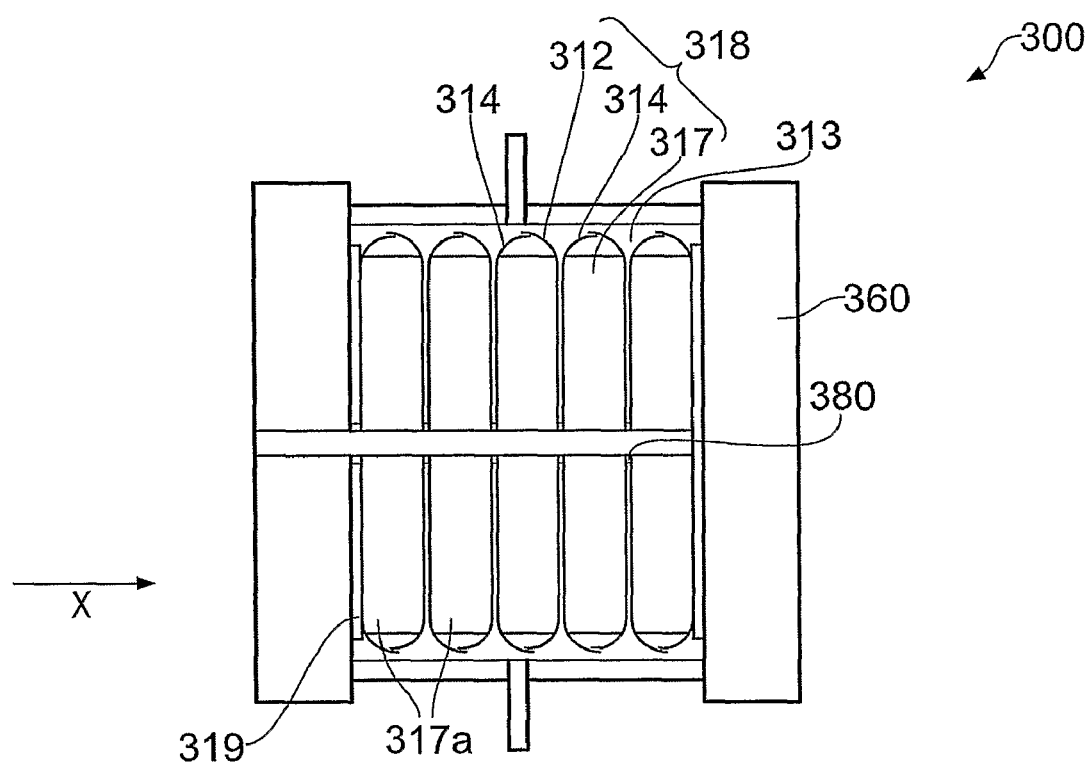
FIG. 15 shows a heat exchanger according to a third embodiment of the invention in (a) cross-section along line YY shown in (b); and (b) a side view of a heat exchanger according to the third embodiment as viewed along direction X of (a)
Figure 15B:
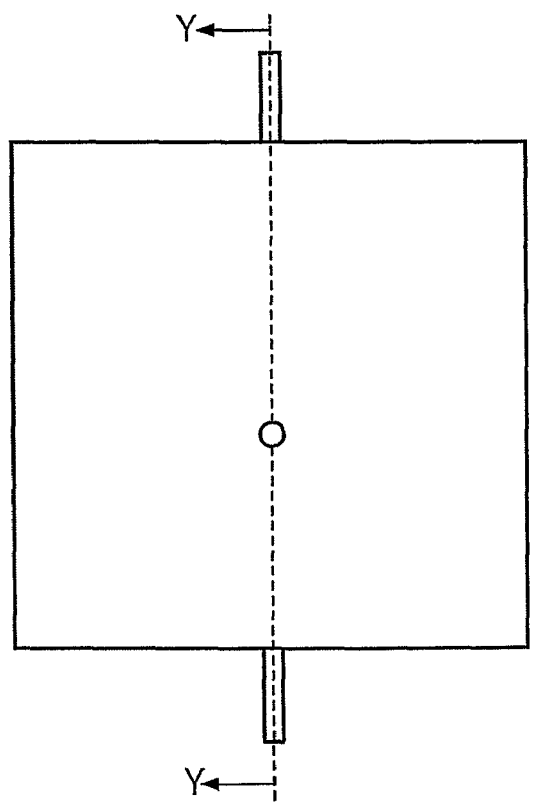

FIG. 15 shows a plate heat exchanger 300 according to a third embodiment of the invention. The third embodiment is similar to the second embodiment except that chambers 317A are in fluid communication by means of fluid tight connecting sections 380 formed through plate elements 312, 314 (which correspond respectively to etched plate element 212 and plain plate element 214 of the second embodiment).

Figure 16:
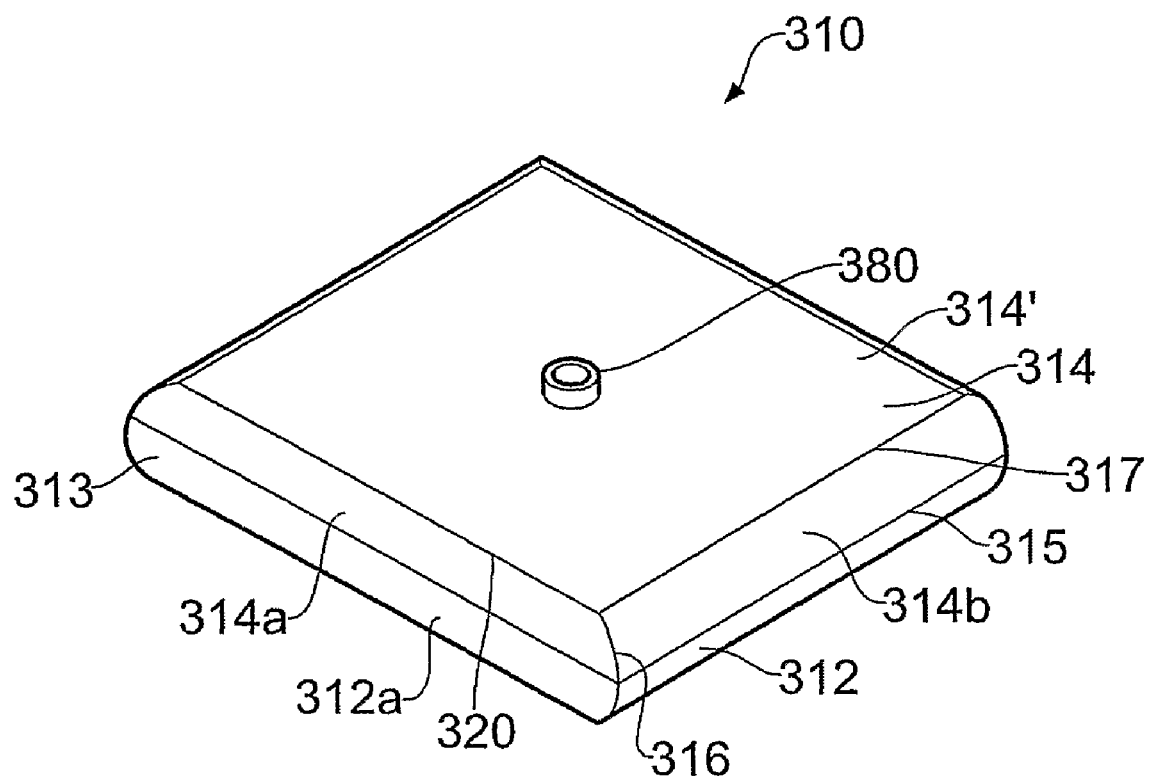
FIG. 16 is a perspective view of a single modular unit of the heat exchanger of FIG. 15.

FIG. 16 shows a perspective view of a single modular unit 310 of the heat exchanger of FIG. 15. Plate elements 312, 314 are joined by brazing or any other suitable technique along edge 315; it will be appreciated that in some embodiments of the invention some overlap of plate elements 312, 314 may be required in order for a joint to be formed between plate elements 312, 314.

Sides 313 of unit 310 may be formed from a separate sheet of material, or by folding peripheral portions of plate elements 312, 314 towards one another to form respective side portions 312A, 314A, and joining the side portions by brazing or any other suitable joining technique.

In some embodiments of the invention, unit 310 is shaped such that edges of the unit are curved. For example, in some embodiments edge 316 between side portion 314A and portion 314B of plate element 314 is curved. In some embodiments an edge 320 between side portion 314A and a major face 314' of plate element 314 is curved. Furthermore, in some embodiments an edge 317 between major face 314' of plate element 314 and edge portion 314B of plate element 314 is curved.

The use of curved edges, as opposed to abrupt edges, reduces a risk that stress concentration effects at abrupt edges will result in failure of a unit 30, for example by cracking of a portion of a plate member, or of a seam between elements or between portions of a plate member.

Thus, in some embodiments of the invention substantially all edges of the unit 310 are of a curved form, with discrete edges being replaced by surfaces of simple or compound curvature.

In order to form thermal fluid channels between units 310, units are joined together such that etched plate element 312 of one unit 310 abuts plain plate element 314 of an adjacent unit thereby to define thermal fluid channels between adjacent units 310.

The modular unit 310 contains sorbent material. Sorbent material may be introduced into the unit 310 through connecting section 380.

Figure 17:
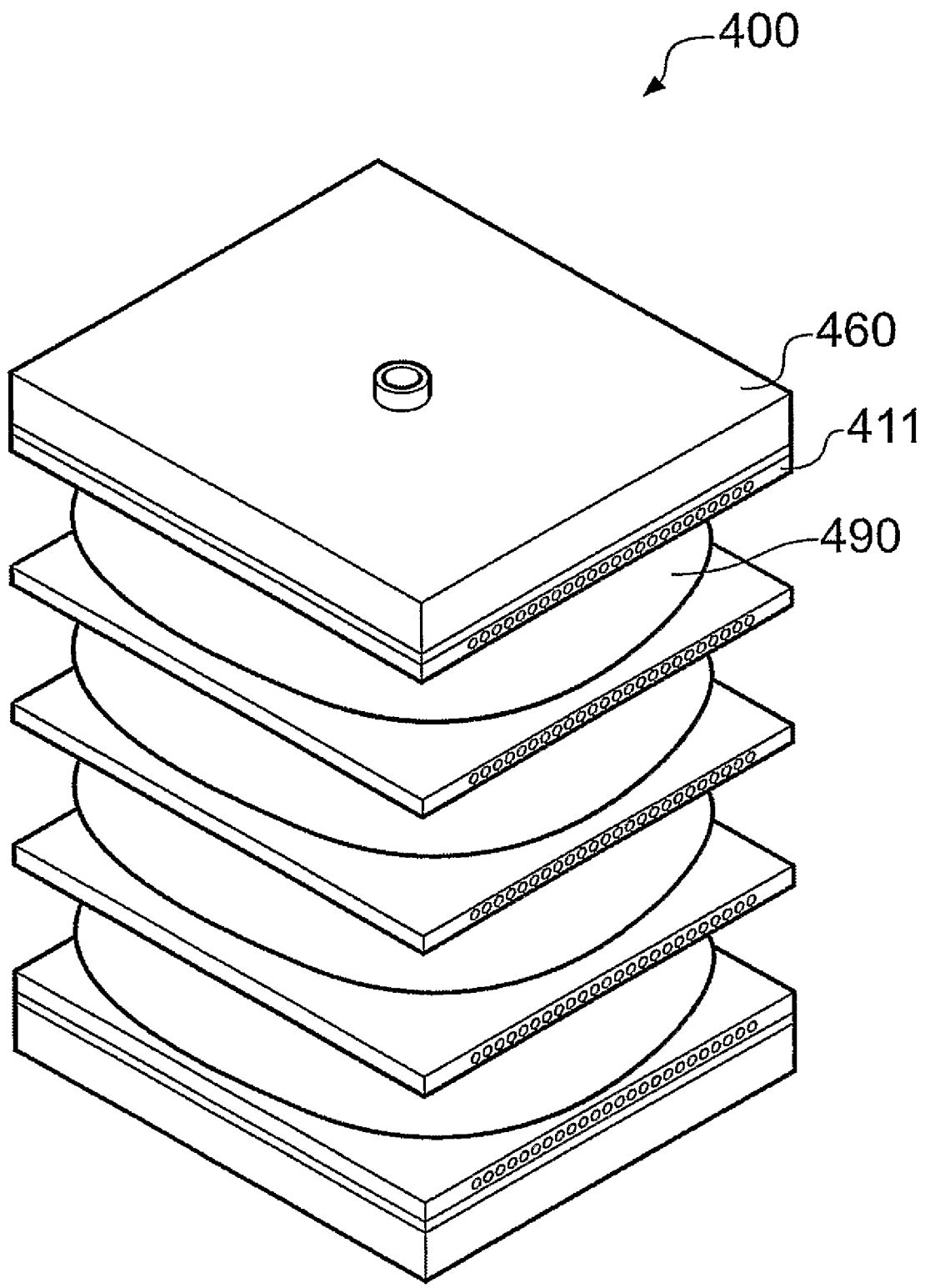
FIG. 17 is an exploded view of a heat exchanger according to a fourth embodiment of the invention showing a stack of the modular units of FIG. 18.
Figure 18:
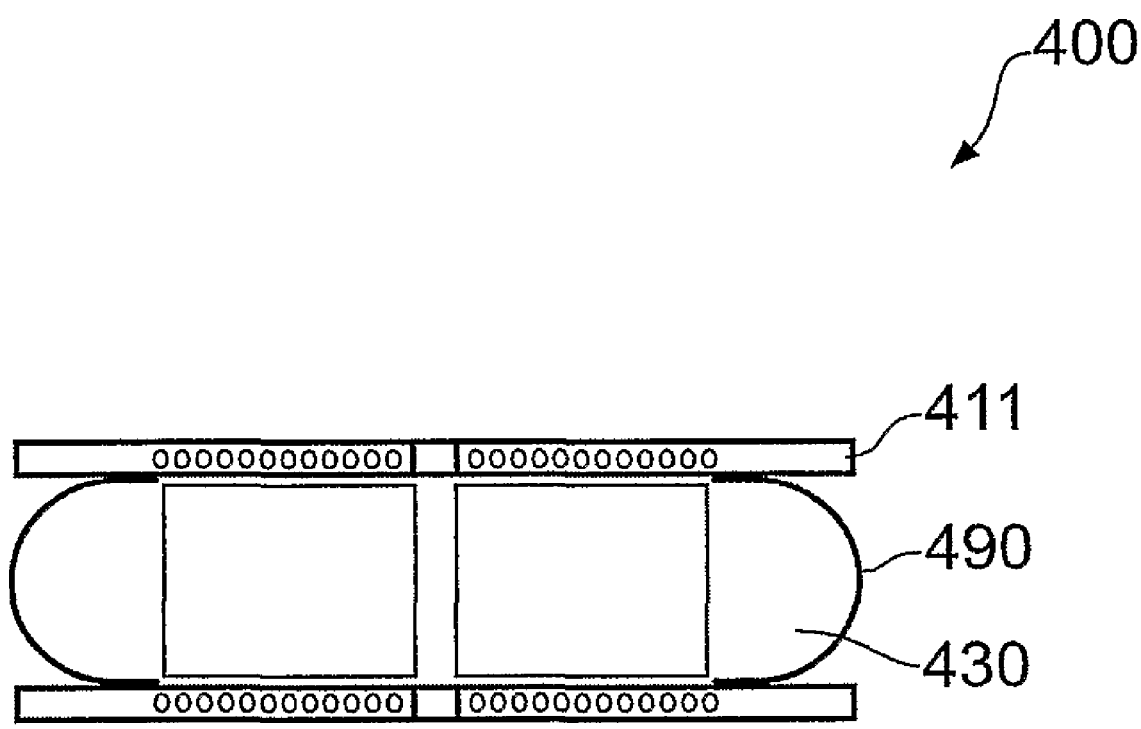
FIG. 18 is a cross-sectional view of one of the modular units of FIG. 17.

FIGS. 17 and 18 show a fourth embodiment of the invention wherein a plate heat exchanger 400 comprises a plurality of thin planar plate members 411 having fluid channels formed therethrough. According to the fourth embodiment plate members 411 are formed by joining an etched plate element and a plain plate element together, the etched and plain plate elements being substantially as described with respect to etched and plain plate elements 12, 14 according to the first embodiment.

As in the case of the first, second and third embodiments, pressure flanges are attached at each end of the resulting structure, and connected to one another by bolts. The pressure flanges act to prevent the structure from distorting or exploding when the exchanger is pressurised in use.

Endcaps 490 (FIG. 18) are provided between respective adjacent plate members 411 in order to define a chamber 430 between respective plate members which may be filled with sorbate material. According to the fourth embodiment endcaps 490 are of substantially semicircular cross-section and are attached to plate members 411 by brazing. In alternative embodiments the plate members may be substantially flat, of right-angled section, arcuate or any other suitable shape.

It will be understood that fluid channels may be defined in a variety of different ways in different embodiments of the invention. For example, channels may be defined between plate members by insertion of a corrugated sheet between plate members, for example of metal. The corrugated sheet may be welded, brazed or otherwise attached to the plate members. Alternatively the corrugated sheet may not be attached to the plate members, but rather lie in abutment with one or both of the adjacent plate members.

In some embodiments of the invention the plate members through which thermal fluid is passed are formed from a single plate element, i.e. the plate member does not comprise two or more plate elements. In some embodiments the plate member is formed by extrusion of a material such as aluminum, the plate member having a plurality of channels formed therethrough as a consequence of the extrusion process.

Figure 19:
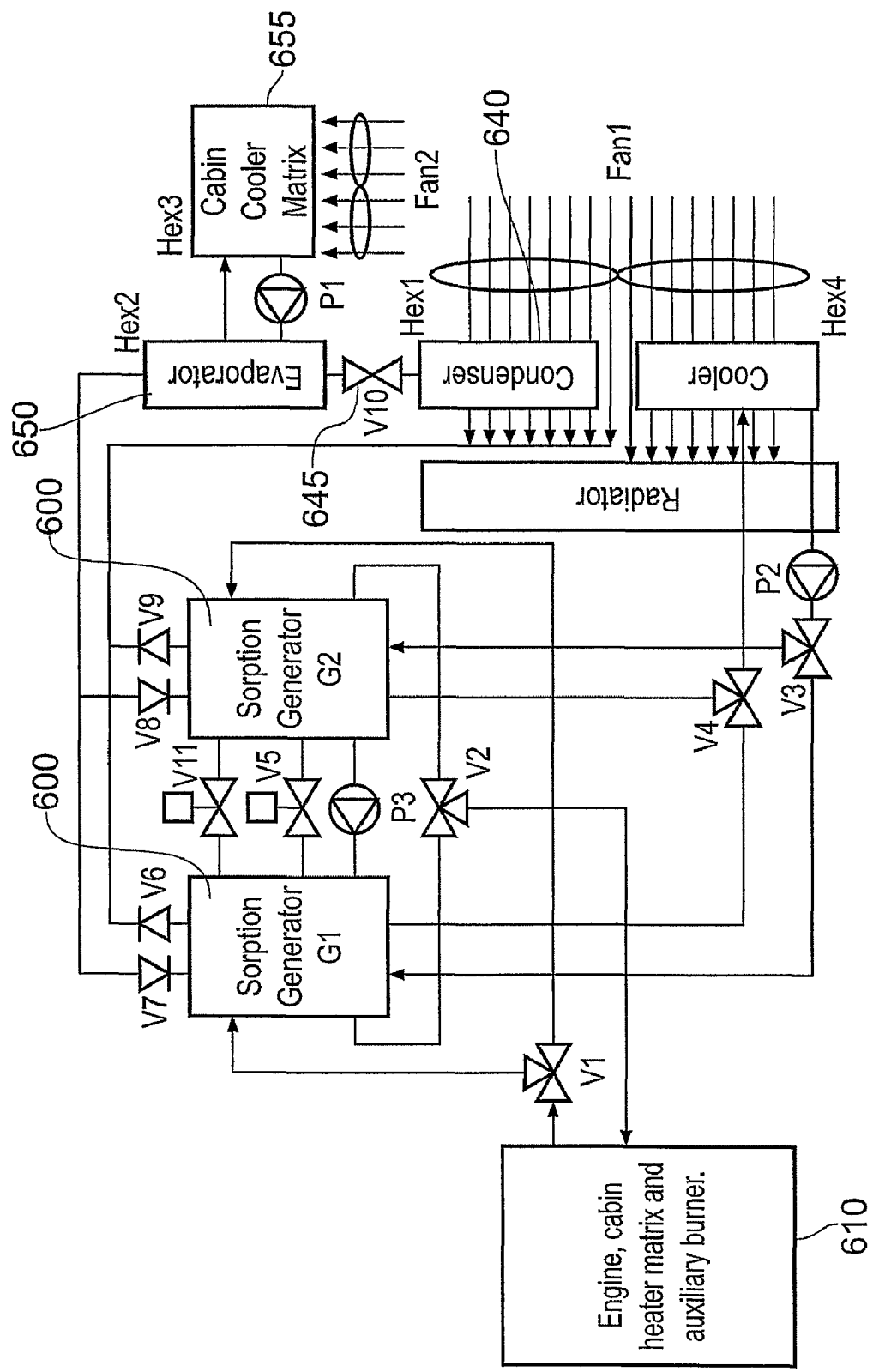
FIG. 19 is a schematic diagram of an air conditioning unit incorporating a pair of heat exchangers according to some embodiments of the present invention.

FIG. 19 is a schematic illustration of a vehicle mobile air conditioning system employing two heat exchangers (or 'generators') 600 according to embodiments of the invention driven by the waste heat of the engine. The heat exchangers 600 are operated in a substantially out-of-phase manner in order to provide substantially continuous cooling of a reservoir (evaporator) 650.

This is a substantially more practical arrangement than a single generator arrangement where discontinuous cooling is obtained.

In the arrangement shown in FIG. 19, the system is configured such that the one way valves V6, V7, V8, V9 are actuated so desorbed gas from whichever one of the heat exchangers 600 (i.e. G1 or G2) that is being heated is routed to a condenser 640.

In the case of the heat exchanger 600 being cooled, when the pressure falls below that in the evaporator 650 the corresponding valve V7 or V8 is opened to allow gas to enter from the evaporator 650.

Gas is cooled to a liquid state in the condenser 640 before being passed to the evaporator via expansion device 645. It will be appreciated that, during continuous operation, a supply of substantially continuously boiling liquid is present in the evaporator 650.

It will be appreciated that a driving heat source 610 is required, such as waste heat from the engine, and/or an auxiliary burner.

The evaporator 650 may be connected to a cabin cooler matrix 655 of a motorvehicle.

It will be appreciated that in alternative systems further heat exchangers 600 may be employed, the systems being configured to operate respective heat exchangers in a complimentary manner to provide cooling of a reservoir.

Embodiments of the invention are suitable for use in heat pumps, thermal transformers and cooling systems.

In some embodiments of the invention, a thermally conductive member is provided in the slots 30. In some embodiments of the invention the thermally conductive member is in the form of a corrugated plate made from aluminum.

Figure 20:
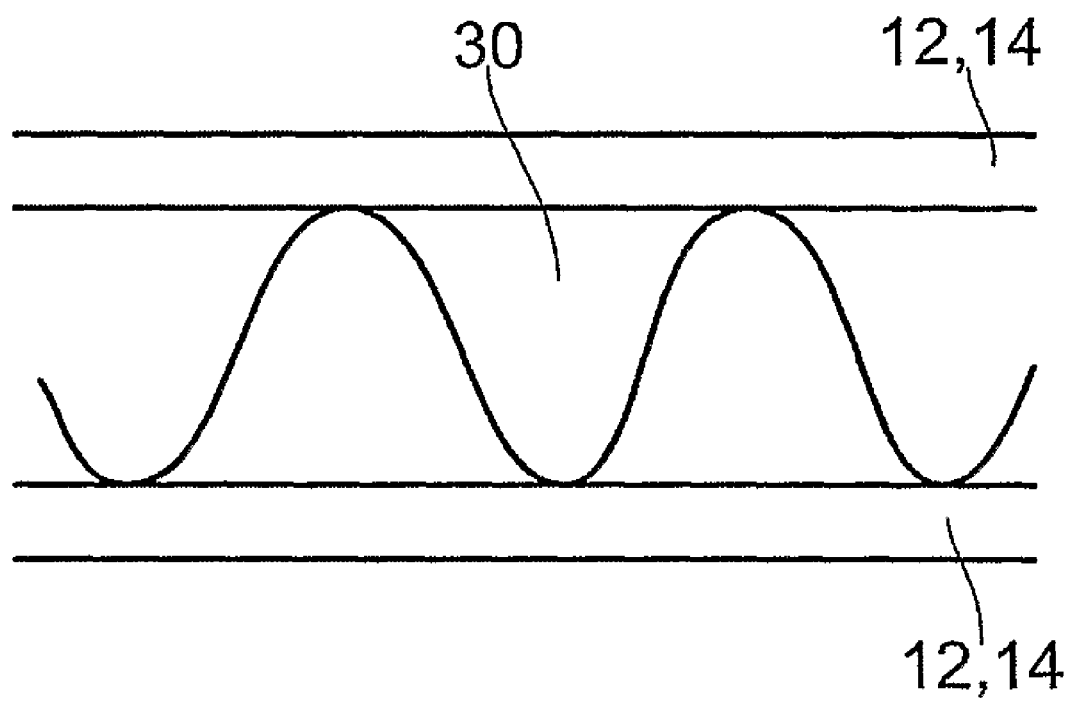
FIG. 20 is a cross-sectional view of a channel region of a heat exchanger according to an embodiment of the invention having a corrugated thermally conductive member provided therein.

FIG. 20 shows a portion of a heat exchanger in which the thermally conductive member 700 is in the form of a corrugated aluminum plate that is in abutment with opposed walls of the slot 30. The presence of the plate assists in transferring thermal energy between the plate elements 12, 14 and the sorbate material provided within the slots 30.

Figure 21:
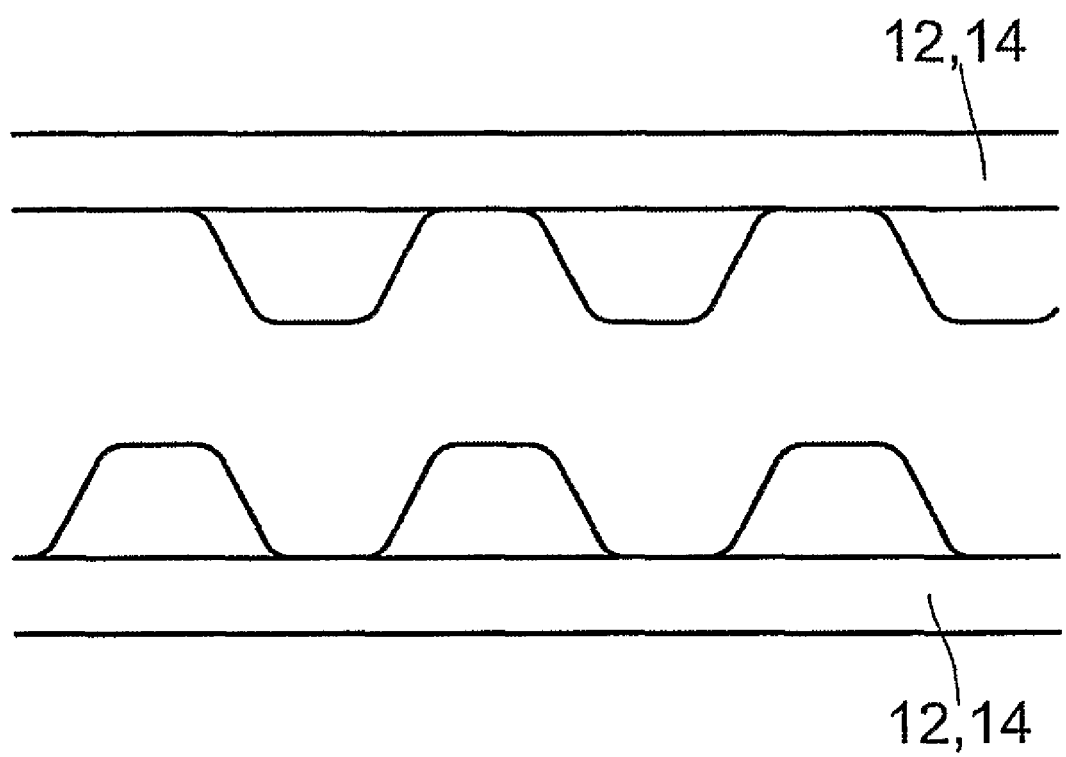
FIG. 21 is a cross-sectional view of a channel region of a heat exchanger according to an embodiment of the invention having a pair of corrugated thermally conductive members provided therein.

FIG. 21 shows an alternative embodiment in which two thermally conductive members 700 are provided in each slot 30. In the embodiment of FIG. 21 the thermally conductive members 700 are each in abutment with a single plate element 12, 14. In the embodiment of FIG. 21 a separate thermally conductive member 700 is provided on each of the opposed faces of each slot 30; furthermore, each thermally conductive member 700 is in contact with only one of the opposed faces of each slot.

Figure 22:
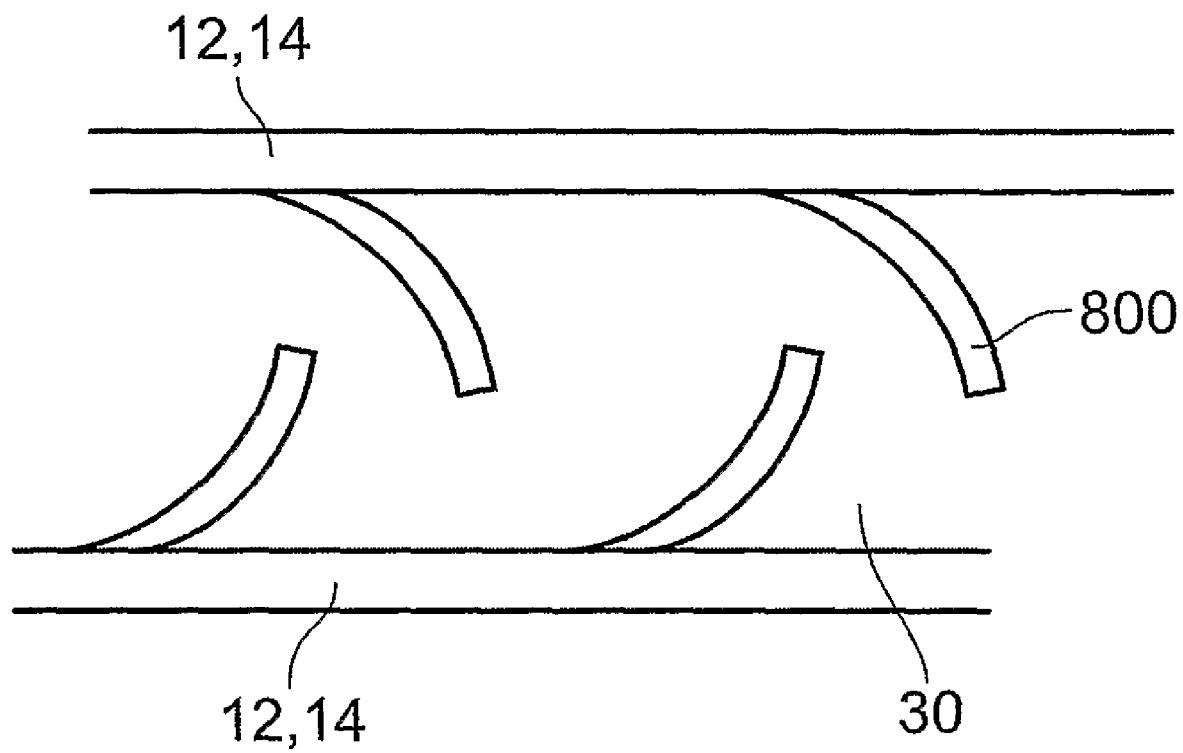
FIG. 22 is a cross-sectional view of a channel region of a heat exchanger according to an embodiment of the invention having a plurality of fins protruding from plate members of the heat exchanger.

FIG. 22 shows a portion of a further embodiment of the invention in which a plurality of fins 800 protrude into the slots 30. The fins assist in conducting thermal energy between sorbent material provided in the slots 30, and thermal transfer fluid provide in channels defined by the plate elements 12, 14. In some embodiments of the invention the fins are of curved profile as shown in FIG. 22. In further embodiments of the invention, the fins are of straight profile, or any other suitable profile.

Figure 23:
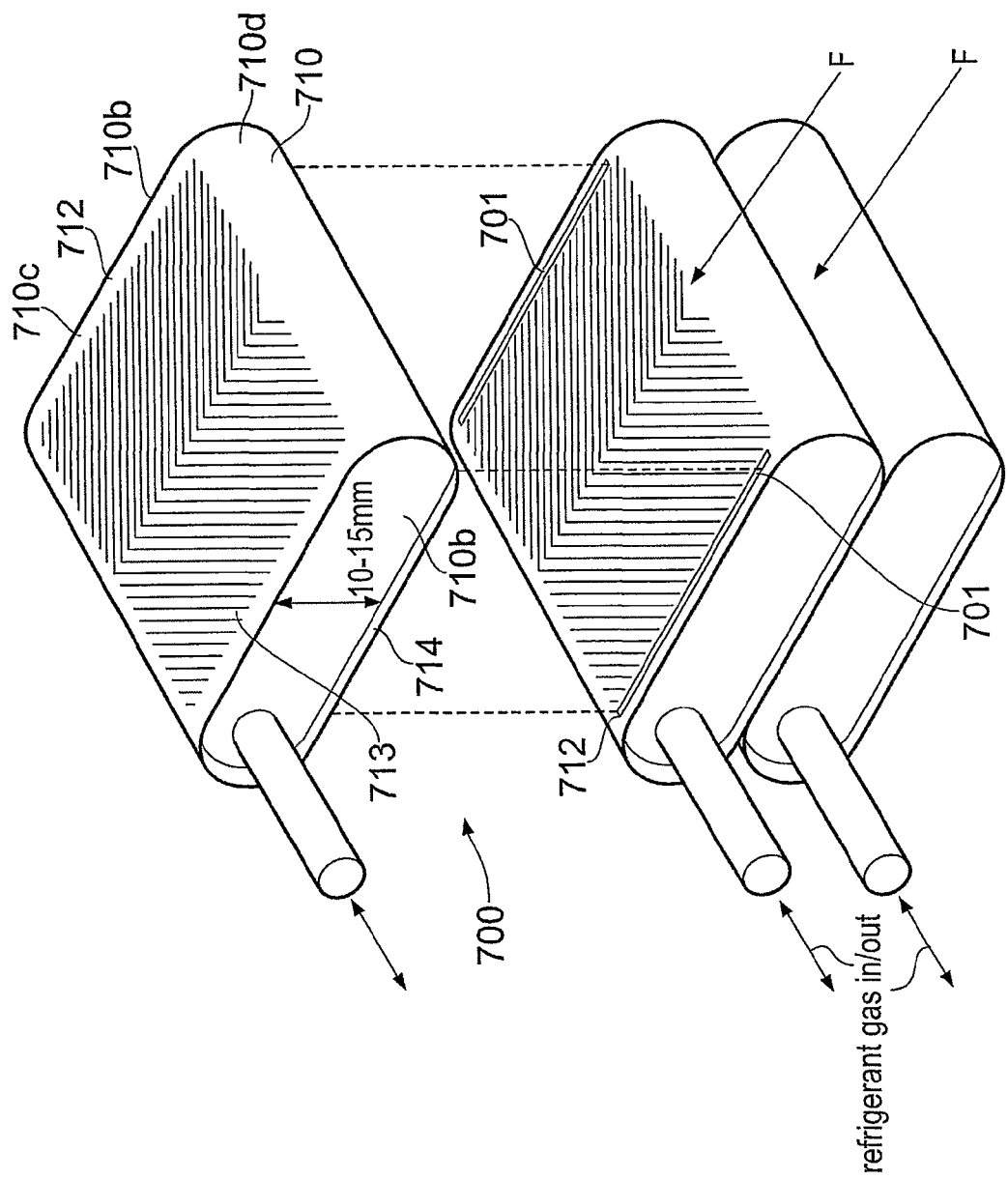
FIG. 23 is an exploded view of a further embodiment of the invention.

A further embodiment of the invention is shown schematically in FIG. 23. According to the embodiment shown, a plurality of plate element packages 700 are provided. Each package 700 has a generally tubular portion 710 having substantially semicircular end portions 710D connected by substantially flat plate element portions 710C. A pair of substantially flat panels 710B are provided at opposed ends of the tubular portion 710.

The tubular portion 710 of each package 700 is formed from a single sheet of material bent to form the required shape. In some embodiments two or more sheets may be used.

According to the embodiment shown, opposed ends of the sheet are brazed, welded or otherwise bonded together. Blocks of sorbent material are then inserted into the tubular portion 710 and panels 710B welded to the ends of the tubular portion 710 to form a gas tight package.

According to some embodiments of the invention the tubular portion 710 is compressed after the sorbent material is added and before the tubular portion is compressed. This operation is performed in order to ensure good thermal contact between the sorbent material and walls of the plate element packages 700.

Packages 700 are welded, brazed or otherwise bonded together in a stacked configuration, with outer faces of opposed faces 712, 714 of adjacent packages 700 being in mutual abutment. In the embodiment of FIG. 23 the packages 700 are bonded along edges 701 in order to restrict heat transfer fluid flow in the direction of arrow F (or the opposite direction). In other words, fluid is forced to flow in the region of the packages 700 where herringbone channels are provided. Thus the fluid is prevented from avoiding flow in the region of the herringbone channels.

According to the embodiment shown in FIG. 23, channels 713 are etched in opposed faces 712, 714 of the tubular portion 710 in a parallel chevron (or 'herringbone') configuration. Channels on opposed faces are arranged such that the chevrons of one face 712 are oriented at 180° to chevrons of the opposite face 714. This arrangement allows fluid flow in the direction of arrow F (or the opposite direction) whilst also promoting thermal transfer between the fluid and walls of the packages 700.

In some embodiments the tubular portion 710 is formed from a single sheet of material bent to the shape shown. Typically, the formation of the channels 713 is performed before bending the sheet.

In some embodiments the tubular portion 710 is formed from separate components including two separate generally semicircular end portions 710D and two substantially flat plate element portions 710C.

As discussed above in relation to other embodiments of the invention, the channels may be formed by machining, stamping, or any other suitable method instead of or in addition to etching.

Gas inlet/outlet pipes are provided in a panel 710B of each package 700 to allow sorbate (in gaseous form) to flow readily in and out of the package.

The panels 710B according to the present embodiment are from around 10 to around 15 mm in width. In other words the distance between faces 712, 714 of a single package 700 is from around 10 to around 15 mm in width. The panel 710B may be around 2-3 mm thick or less in some embodiments of the invention.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A heat exchanger comprising:
a plurality of stacked plate members each plate member being provided with at least one fluid channel therein, each plate member having a channel inlet and a channel outlet associated with each channel of the plate member;
a plurality of chambers, the chambers being provided between opposed major faces of respective adjacent plate members, the chambers containing a sorbent material;
a thermal fluid inlet in communication with a plurality of the channel inlets and a thermal fluid outlet in communication with a plurality of the channel outlets; and
a sorbate inlet and a sorbate outlet in communication with each of the chambers, the fluid channels being provided in fluid isolation from the chambers.

2. A heat exchanger as claimed in claim 1 wherein each plate member comprises a first plate element and a second plate element in mutual abutment thereby to define the at least one channel.

3. A heat exchanger as claimed in claim 2 wherein one or both of the first and second plate elements are provided with a series of open channels thereon.

4. A heat exchanger as claimed in claim 1 wherein the thickness of a plate member is one selected from amongst $\leqq 20\%$ of a distance between opposed faces of adjacent plate members and $\leqq 10\%$ of a distance between opposed faces of adjacent plate members.

5. A heat exchanger as claimed in claim 1 wherein a spacer is provided between respective opposed plate members thereby to define a portion of a wall of each chamber.

6. A heat exchanger as claimed in claim 1 wherein at least a portion of a wall of a chamber is curved.

7. A heat exchanger as claimed in claim 1 wherein the wall of a chamber comprises an end formation.

8. A heat exchanger as claimed in claim 1 wherein the end formation comprises at least one selected from amongst at least one substantially flat face, at least one curved face, a portion of at least one of the opposed plate members, a first plate element of one plate member and an end portion of an opposed second plate element of an adjacent plate member, a portion wherein portions of adjacent, opposed plate elements of different respective plate members are joined together and an end cap configured to define at least a portion of the wall of the chamber, said portion being disposed between adjacent plate members.

9. A heat exchanger as claimed in claim 1 wherein the plate members are one of a substantially square shaped plate member, a substantially rectangular shaped plate member, and a substantially circular shaped plate member.

10. A heat exchanger as claimed in claim 1 wherein at least a pair of adjacent chambers are in fluid communication with one another via an aperture formed through the plate member disposed between the adjacent chambers.

11. A heat exchanger as claimed in claim 10 wherein the aperture is provided through a central portion of the plate member.

12. A heat exchanger as claimed in claim 1 wherein the sorbate outlet is provided by the sorbate inlet.

13. A heat exchanger as claimed in claim 1 wherein the chambers are in fluid communication with one another via a manifold.

14. A heat exchanger as claimed in claim 1 further comprising an end plate at each of two opposite ends of the heat exchanger, the end plates being configured to confer structural rigidity when the heat exchanger is subjected to internal pressure.

15. A heat exchanger as claimed in claim 14 wherein respective end plates are connected together by connection means.

16. A heat exchanger as claimed in claim 15 wherein the connection means comprises at least one bolt or bolt-like member.

17. A heat exchanger as claimed in claim 14 wherein respective end plates are curved, thereby to define an internal volume of each end plate, the internal volume being in fluid communication with the chambers.

18. A heat exchanger as claimed in claim 17 wherein respective end plates are of a dome or dome-like shape.

19. A heat exchanger as claimed in claim 1 wherein the sorbent material comprises a solid sorbent material, the solid sorbent material comprising at least one selected from amongst a microporous material, an active carbon material, a zeolite material, a silica gel and a metallic salt.

20. A heat exchanger as claimed in claim 1 wherein the sorbent material is provided in a thermally conductive matrix, the thermally conductive matrix comprising at least one selected from amongst graphite, expanded natural graphite and a metallic foam material.

21. A heat exchanger as claimed in claim 1 wherein one or more thermally conductive members are provided in at least one chamber, the one or more thermally conductive members being arranged to be capable of conducting thermal energy between a plate member defining a wall of the chamber and a sorbent material provided within the chamber, wherein the at least one thermally conductive member comprises a corrugated sheet of material, at least a portion of a face of the at least one thermally conductive member being provided in mutual abutment with a major face of a plate member, and the at least one thermally conductive member comprises aluminum.

22. A heat exchanger as claimed in claim 21 wherein portions of respective different opposite faces of the at least one thermally conductive member are in contact with respective portions of different adjacent plate members thereby providing at least one thermal pathway between adjacent plate members across an interior of the chamber.

23. A heat exchanger as claimed in claim 21 wherein the at least one thermally conductive member comprises at least one fin protruding into the at least one chamber from a wall of the chamber.

24. A heat exchanger as claimed in claim 1 further comprising a sorbate material in each chamber, wherein the sorbate material comprises ammonia.

25. A method of cooling a reservoir in a sorption device comprising:
    providing a plurality of plate members, each plate member having at least one fluid channel provided therein, the at least one channel having a channel inlet and a channel outlet;
    providing a thermal fluid inlet in communication with the at least one channel inlet and a fluid outlet in communication with the at least one channel outlet;
    providing a plurality of chambers between the plate members, the chambers being provided in fluid isolation from the at least one channel;
    providing a sorbent material in each of the chambers;
    providing a sorbate inlet and a sorbate outlet in fluid communication with the chambers;
    connecting the sorbate inlet and sorbate outlet to at least one reservoir thereby to form a closed system;
    connecting the fluid inlet and fluid outlet to a fluid source;
    providing a quantity of sorbate in each chamber;
    passing a thermal fluid at a first temperature through the channels thereby to cause adsorption of the sorbate on the sorbent material;
    passing a thermal fluid at a second temperature through the channels thereby to cause desorption of the sorbate from the sorbent material.

26. A sorption generator comprising:
    a plurality of stacked plate members each plate member being provided with a series of fluid channels therein and comprising a first plate element and a second plate element in mutual abutment thereby to define the series of fluid channels, wherein one or both of the first and second plate elements are provided with a series of open channels thereon, each plate member having a channel inlet and a channel outlet associated with each channel of the plate member;

a plurality of chambers, the chambers being provided between opposed major faces of respective adjacent plate members, the chambers containing a sorbent material, wherein a spacer is provided between respective opposed plate members thereby to define a portion of a wall of each chamber;

a thermal fluid inlet in communication with a plurality of the channel inlets and a thermal fluid outlet in communication with a plurality of the channel outlets; and a sorbate inlet and a sorbate outlet in communication with each of the chambers, the fluid channels being provided in fluid isolation from the chambers.

* * * * *